US011755517B2

(12) United States Patent
Yamaura et al.

(10) Patent No.: US 11,755,517 B2
(45) Date of Patent: Sep. 12, 2023

(54) COMMUNICATION CONTROL DEVICE, COMMUNICATION CONTROL METHOD, INFORMATION PROCESSING DEVICE, INFORMATION PROCESSING METHOD, AND COMPUTER PROGRAM PRODUCT

(71) Applicant: KABUSHIKI KAISHA TOSHIBA, Tokyo (JP)

(72) Inventors: Takahiro Yamaura, Kawasaki Kanagawa (JP); Yasin Oge, Sagamihara Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 135 days.

(21) Appl. No.: 17/446,433

(22) Filed: Aug. 30, 2021

(65) Prior Publication Data

US 2022/0197841 A1 Jun. 23, 2022

(30) Foreign Application Priority Data

Dec. 17, 2020 (JP) .................... 2020-209601

(51) Int. Cl.
*G06F 13/28* (2006.01)
*G06F 9/54* (2006.01)
*G06F 13/16* (2006.01)

(52) U.S. Cl.
CPC ............ *G06F 13/287* (2013.01); *G06F 9/546* (2013.01); *G06F 13/1642* (2013.01)

(58) Field of Classification Search
CPC .... G06F 13/287; G06F 9/546; G06F 13/1642; H04L 2463/101; H04L 2463/102;
(Continued)

(56) References Cited

U.S. PATENT DOCUMENTS 4,131,761 A * 12/1978 Giusto ...................... H04L 5/04
 375/365
4,490,748 A * 12/1984 Kamath ................. H04N 9/882
 386/302
(Continued)

FOREIGN PATENT DOCUMENTS

JP 2018-125597 A 8/2018

OTHER PUBLICATIONS

IEEE Standards Assoc., "Bridges and Bridged Networks, Amendment 25: Enhancements for Scheduled Traffic (IEEE Std 802.1Qbv™—2015)," 57 pages (2015).
(Continued)

*Primary Examiner* — Paul R. Myers
(74) *Attorney, Agent, or Firm* — Finnegan, Henderson, Farabow, Garrett & Dunner, LLP

(57) ABSTRACT

A communication control device according to an embodiment includes one or more hardware processors functioning as a transmission control unit and a communication unit. The transmission control unit performs control of transmission of messages by opening and closing a gate based on transmission permission information. The transmission permission information is generated based on gate control information including a plurality of entries for determining whether to open a plurality of gates corresponding to a plurality of queues. The transmission permission information indicates an amount of transmittable messages in a period corresponding to one or more continuous entries. The communication unit transmits and receives messages in accordance with the control of the transmission control unit.

21 Claims, 35 Drawing Sheets

(58) Field of Classification Search
CPC ....... H04L 63/00; H04L 63/04; H04L 63/104; H04L 63/20; H04L 1/0061; H04L 12/02
USPC ......................................................... 710/308
See application file for complete search history.

(56) References Cited

U.S. PATENT DOCUMENTS

| | | | | |
|---|---|---|---|---|
| 5,587,961 | A * | 12/1996 | Wright | G11C 7/1072 |
| | | | | 365/233.5 |
| 5,826,063 | A * | 10/1998 | Richter | G06F 9/3869 |
| | | | | 712/E9.063 |
| 6,807,638 | B1 * | 10/2004 | Moyal | H04J 3/0685 |
| | | | | 713/400 |
| 6,912,199 | B1 * | 6/2005 | Liang | H04L 43/50 |
| | | | | 370/465 |
| 7,085,869 | B1 * | 8/2006 | Acharya | H04L 47/50 |
| | | | | 710/263 |
| 2003/0095464 | A1 * | 5/2003 | Huang | G06F 13/1689 |
| | | | | 365/230.06 |
| 2003/0123389 | A1 * | 7/2003 | Russell | G06F 11/273 |
| | | | | 370/230.1 |
| 2007/0162642 | A1 * | 7/2007 | Tousek | G06F 13/28 |
| | | | | 710/22 |
| 2011/0153954 | A1 * | 6/2011 | Seki | G06F 12/0866 |
| | | | | 711/141 |
| 2014/0372702 | A1 * | 12/2014 | Subramanyam | G06F 12/0848 |
| | | | | 711/129 |
| 2019/0121781 | A1 * | 4/2019 | Kasichainula | H04L 12/4645 |
| 2019/0158620 | A1 * | 5/2019 | Oge | H04L 49/90 |
| 2019/0215832 | A1 | 7/2019 | Nishimura | |
| 2020/0089525 | A1 * | 3/2020 | Kobayashi | G06F 9/4856 |
| 2020/0389405 | A1 * | 12/2020 | Mardmoeller | H04L 12/40143 |
| 2021/0328944 | A1 * | 10/2021 | Kasichainula | H04L 47/6215 |
| 2021/0377189 | A1 * | 12/2021 | Yamaura | H04L 47/6295 |

OTHER PUBLICATIONS

IEEE Standards Assoc., "Bridges and Bridged Networks (IEEE Std 802.1Q™—2018)," 1993 pages (2018).

* cited by examiner

FIG.3

| | GATE STATE | | | | | | | | TIME INTERVAL |
|---|---|---|---|---|---|---|---|---|---|
| | TC0 | TC1 | TC2 | TC3 | TC4 | TC5 | TC6 | TC7 | |
| T00 | o | o | c | o | c | o | c | o | 128μs |
| T01 | o | o | o | o | o | o | o | c | 128μs |
| T02 | o | c | o | c | o | c | o | o | 512μs |
| T03 | o | c | o | c | o | c | o | o | 128μs |
| T04 | o | o | c | o | c | o | c | c | 128μs |
| T05 | o | o | c | o | c | o | c | o | 512μs |

FIG.9

| | GATE STATE | | | | | | | | TIME INTERVAL |
|---|---|---|---|---|---|---|---|---|---|
| | TC0 | TC1 | TC2 | TC3 | TC4 | TC5 | TC6 | TC7 | |
| T00 | o (∞) | o (256μs) | C | o (256μs) | C | o (256μs) | C | o (128μs) | 128μs |
| T01 | o (∞) | o (128μs) | o (768μs) | o (128μs) | o (768μs) | o (128μs) | o (768μs) | C | 128μs |
| T02 | o (∞) | C | o (640μs) | C | o (640μs) | C | o (640μs) | o (640μs) | 512μs |
| T03 | o (∞) | C | o (128μs) | C | o (128μs) | C | o (128μs) | o (128μs) | 128μs |
| T04 | o (∞) | o (896μs) | C | o (896μs) | C | o (896μs) | C | C | 128μs |
| T05 | o (∞) | o (768μs) | C | o (768μs) | C | o (768μs) | C | o (640μs) | 512μs |

FIG.10

| TIME | TC7 | TC6 | TC5 | TC4 | TC3 | TC2 | TC1 | TC0 |
|---|---|---|---|---|---|---|---|---|
| | | | FRAME TRANSMISSION PERMISSION TIME | | | | | |
| <128μs | 128μs | 0μs | 256μs | 0μs | 256μs | 0μs | 256μs | ∞ |
| <256μs | 0μs | 768μs | 128μs | 768μs | 128μs | 768μs | 128μs | ∞ |
| <768μs | 640μs | 640μs | 0μs | 640μs | 0μs | 640μs | 0μs | ∞ |
| <896μs | 128μs | 128μs | 0μs | 128μs | 0μs | 128μs | 0μs | ∞ |
| <1024μs | 0μs | 0μs | 896μs | 0μs | 896μs | 0μs | 896μs | ∞ |
| <1536μs | 640μs | 0μs | 768μs | 0μs | 768μs | 0μs | 768μs | ∞ |

FIG.11

FRAME TRANSMISSION PERMISSION TIME

| TIME | TC7 | TC6 | TC5 | TC4 | TC3 | TC2 | TC1 | TC0 |
|---|---|---|---|---|---|---|---|---|
| <128μs | 128μs | | | | | | | ∞ |
| <256μs | | 768μs | 256μs | 768μs | 256μs | 768μs | 256μs | |
| <768μs | 640μs | | | | | | | |
| <896μs | | | | | | | | |
| <1024μs | | | 896μs | | 896μs | | 896μs | |
| <1536μs | 640μs | | | | | | | |

FIG.12

| TIME | TC7 | TC6 | TC5 | TC4 | TC3 | TC2 | TC1 | TC0 |
|---|---|---|---|---|---|---|---|---|
| <128μs | 16000bytes | 0bytes | 32000bytes | 0bytes | 32000bytes | 0bytes | 32000bytes | ∞ |
| <256μs | 0bytes | 96000bytes | 16000bytes | 96000bytes | 16000bytes | 96000bytes | 16000bytes | ∞ |
| <768μs | 80000bytes | 80000bytes | 0bytes | 80000bytes | 0bytes | 80000bytes | 0bytes | ∞ |
| <896μs | 16000bytes | 16000bytes | 0bytes | 16000bytes | 0bytes | 16000bytes | 0bytes | ∞ |
| <1024μs | 0bytes | 0bytes | 112000bytes | 0bytes | 112000bytes | 0bytes | 112000bytes | ∞ |
| <1536μs | 80000bytes | 0bytes | 96000bytes | 0bytes | 96000bytes | 0bytes | 96000bytes | ∞ |

NUMBER OF TRANSMITTABLE BITS

FIG.13

| TIME | TC7 | TC6 | TC5 | TC4 | TC3 | TC2 | TC1 | TC0 |
|---|---|---|---|---|---|---|---|---|
| <128μs | 16000bytes | | 32000bytes | | 32000bytes | | 32000bytes | ∞ |
| <256μs | | 96000bytes | | 96000bytes | | 96000bytes | | |
| <768μs | 80000bytes | | | | | | | |
| <896μs | | | | | | | | |
| <1024μs | | | 112000bytes | | 112000bytes | | 112000bytes | |
| <1536μs | 80000bytes | | | | | | | |

NUMBER OF TRANSMITTABLE BITS

FIG. 14

| NUMBER OF BYTES | NUMBER OF TRANSMITTABLE BITS ||||||||
|---|---|---|---|---|---|---|---|---|
| | TC7 | TC6 | TC5 | TC4 | TC3 | TC2 | TC1 | TC0 |
| <16000bytes | 16000bytes | 0bytes | 32000bytes | 0bytes | 32000bytes | 0bytes | 32000bytes | ∞ |
| <32000bytes | 0bytes | 96000bytes | 16000bytes | 96000bytes | 16000bytes | 96000bytes | 16000bytes | ∞ |
| <96000bytes | 80000bytes | 80000bytes | 0bytes | 80000bytes | 0bytes | 80000bytes | 0bytes | ∞ |
| <112000bytes | 16000bytes | 16000bytes | 0bytes | 16000bytes | 0bytes | 16000bytes | 0bytes | ∞ |
| <128000bytes | 0bytes | 0bytes | 112000bytes | 0bytes | 112000bytes | 0bytes | 112000bytes | ∞ |
| <192000bytes | 80000bytes | 0bytes | 96000bytes | 0bytes | 96000bytes | 0bytes | 96000bytes | ∞ |

FIG.15

| NUMBER OF BYTES | NUMBER OF TRANSMITTABLE BITS | | | | | | | |
|---|---|---|---|---|---|---|---|---|
| | TC7 | TC6 | TC5 | TC4 | TC3 | TC2 | TC1 | TC0 |
| <16000bytes | 16000bytes | | 32000bytes | | 32000bytes | | 32000bytes | ∞ |
| <32000bytes | | 96000bytes | | 96000bytes | | 96000bytes | | |
| <96000bytes | 80000bytes | | | | | | | |
| <112000bytes | | | | | | | | |
| <128000bytes | | | 112000bytes | | 112000bytes | | 112000bytes | |
| <192000bytes | 80000bytes | | | | | | | |

FIG.19

| TIME INTERVAL (TIME) | TIME INTERVAL (NUMBER OF CLOCK CYCLES) | NUMBER OF TRANSMITTABLE BITS |||||||| 
| --- | --- | --- | --- | --- | --- | --- | --- | --- | --- |
| | | TC7 | TC6 | TC5 | TC4 | TC3 | TC2 | TC1 | TC0 |
| 128μs | 20000 | 128000 | 0 | 256000 | 0 | 256000 | 0 | 256000 | ∞ |
| 128μs | 20000 | 0 | 768000 | 128000 | 768000 | 128000 | 768000 | 128000 | ∞ |
| 512μs | 80000 | 640000 | 640000 | 0 | 640000 | 0 | 640000 | 0 | ∞ |
| 128μs | 20000 | 128000 | 128000 | 0 | 128000 | 0 | 128000 | 0 | ∞ |
| 128μs | 20000 | 0 | 0 | 896000 | 0 | 896000 | 0 | 896000 | ∞ |
| 512μs | 80000 | 640000 | 0 | 768000 | 0 | 768000 | 0 | 768000 | ∞ |

FIG.20

| TIME INTERVAL (TIME) | TIME INTERVAL (NUMBER OF CLOCK CYCLES) | NUMBER OF TRANSMITTABLE BITS ||||||||
|---|---|---|---|---|---|---|---|---|---|
| | | TC7 | TC6 | TC5 | TC4 | TC3 | TC2 | TC1 | TC0 |
| 128μs | 20000 | 128000 | | | | | | | 8 |
| 128μs | 20000 | | 768000 | 256000 | | 256000 | | 256000 | |
| 512μs | 80000 | 640000 | | | 768000 | | 768000 | | |
| 128μs | 20000 | | | | | | | | |
| 128μs | 20000 | | | 640000 | | 640000 | | 640000 | |
| 512μs | 80000 | 512000 | | | | | | | |

FIG.22

| CLOCK CYCLE COUNTER | 0 | 1 | 2 | ... | 30 | 31 | 32 | 33 | 34 | ... | 65 | 66 | 67 | ... |
|---|---|---|---|---|---|---|---|---|---|---|---|---|---|---|
| PERIOD COUNTER FOR 33 CLOCK CYCLES | 0 | 1 | 2 | ... | 30 | 31 | 32 | 0 | 1 | ... | 32 | 0 | 1 | ... |
| SUBTRACTION VALUE | 640 | 620 | 620 | 620 | 620 | 620 | 620 | 640 | 620 | 620 | 620 | 640 | 620 | ... |

FIRST CLOCK CYCLE | 32 CLOCK CYCLES | FIRST CLOCK CYCLE | 32 CLOCK CYCLES | FIRST CLOCK CYCLE

FIG.23

| CLOCK CYCLE COUNTER | 0 | 1 | ... | 19 | 20 | 21 | ... | 32 | 33 | 34 | ... | 52 | 53 | ... | 65 | 66 | 67 | ... |
|---|---|---|---|---|---|---|---|---|---|---|---|---|---|---|---|---|---|---|
| SUBTRACTION VALUE | 621 | 621 | 621 | 621 | 620 | 620 | 620 | 620 | 621 | 621 | 621 | 621 | 620 | 620 | 620 | 621 | 621 | 621 |

20 CLOCK CYCLES | 13 CLOCK CYCLES | 20 CLOCK CYCLES | 13 CLOCK CYCLES

COMMUNICATION CONTROL DEVICE, COMMUNICATION CONTROL METHOD, INFORMATION PROCESSING DEVICE, INFORMATION PROCESSING METHOD, AND COMPUTER PROGRAM PRODUCT

CROSS-REFERENCE TO RELATED APPLICATIONS

This application is based upon and claims the benefit of priority from Japanese Patent Application No. 2020-209601, filed on Dec. 17, 2020; the entire contents of which are incorporated herein by reference.

FIELD

Embodiments described herein relate generally to a communication control device, a communication control method, an information processing device, an information processing method, and a computer program product.

BACKGROUND

There are known communication apparatuses that are compatible with time-sensitive networking (TSN) standard and the like to perform real-time communication over a network. According to the TSN, a gate control list that describes enabling/disabling transmission of a queue by time unit determines enabling/disabling transmission of a frame, thereby controlling timing and an amount of transmission.

However, in such a conventional art, a communication resource is not utilized effectively in some cases.

BRIEF DESCRIPTION OF THE DRAWINGS

FIG. 3 is a table illustrating an example of a gate control list;
FIG. 9 is a table illustrating an example of calculated times;
FIG. 10 is a table illustrating an example of generated transmission permission information;
FIG. 11 is a table illustrating an example of generated transmission permission information;
FIG. 12 is a table illustrating an example of generated transmission permission information;
FIG. 13 is a table illustrating an example of generated transmission permission information;
FIG. 14 is a table illustrating an example of generated transmission permission information;
FIG. 15 is a table illustrating an example of generated transmission permission information;
FIG. 19 is a table illustrating an example of generated transmission permission information;
FIG. 20 is a table illustrating an example of generated transmission permission information;
FIG. 22 is a table illustrating an example of subtraction values for a transmittable amount;
FIG. 23 is a diagram illustrating an example of the subtraction values for the transmittable amount.

DETAILED DESCRIPTION

Figure 1:
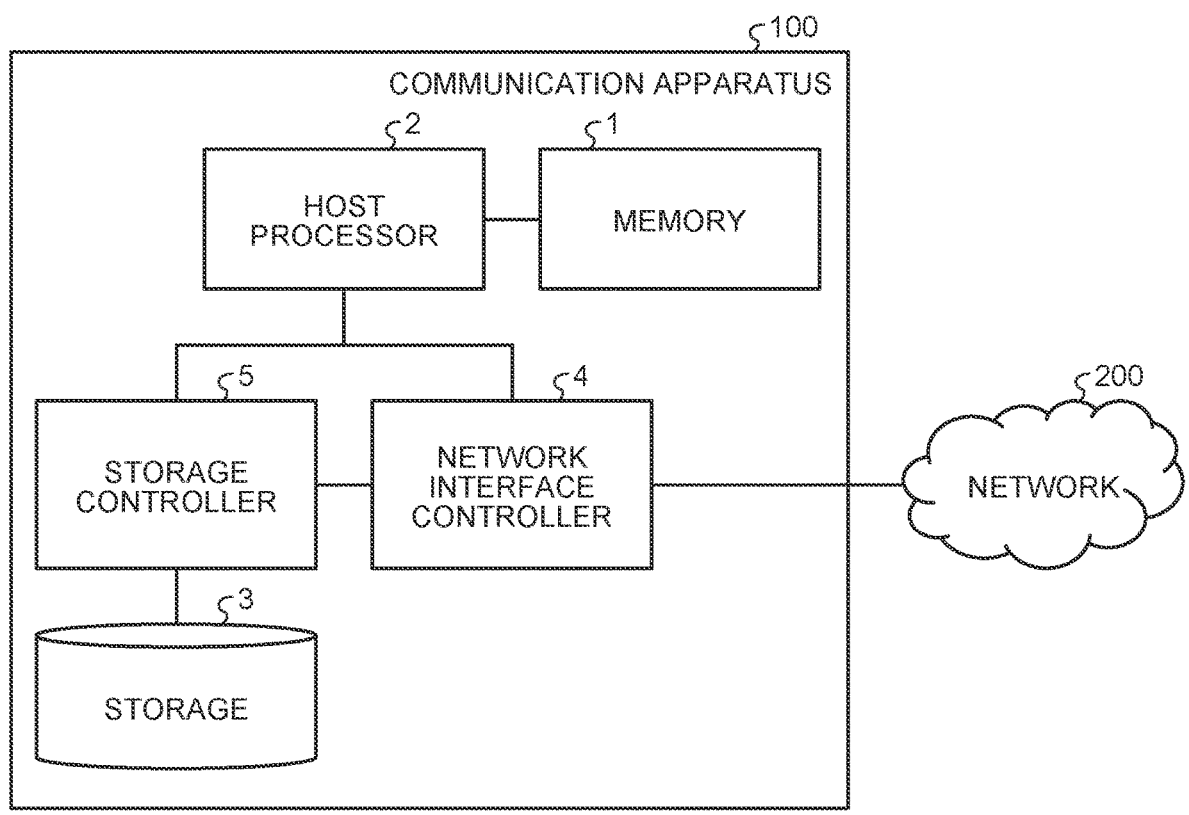
FIG. 1 is a hardware configuration diagram of a communication apparatus according to a first embodiment.

According to an embodiment, a communication control device includes one or more hardware processors configured to function as a transmission control unit and a communication unit. The transmission control unit performs control of transmission of messages by opening and closing a gate based on transmission permission information. The transmission permission information is generated based on gate control information including a plurality of entries for determining whether to open a plurality of gates corresponding to a plurality of queues. The transmission permission information indicates an amount of transmittable messages in a period corresponding to one or more continuous entries. The communication unit to transmits and receives messages in accordance with the control of the transmission control unit.

Preferred embodiments of a communication control devices, a communication control method, an information processing device, an information processing method, and a computer program product according to the present disclosure will be described in detail below with reference to the accompanying drawings. In the following description, an example of using TSN as a standard of real-time communication will be mainly described, but the applicable standard is not limited to TSN.

A gate control list (an example of the gate control information) that includes a plurality of entries for determining whether to open a plurality of gates corresponding to a plurality of queues is used in TSN. According to TSN, in a gate open duration (during which a gate remains open), each of the queues is permitted to transmit frames (an example of the messages) over two or more entries until a corresponding gate is finally closed. With the standard of TSN, a gate switching interval can be set with a granularity of 1 ns. Therefore, when the gate interval is short, a given communication resource can be effectively used by determining whether to permit transmission while checking the plurality of entries.

When the opening and closing of gates is controlled according to the gate control list stored in a format defined in the TSN standard, it is necessary to perform processing of determining whether a frame is permitted to be transmitted while reading a forward gate state (gate state at the time after the current time). However, such a configuration cannot ensure that this process is finished within a certain period of time. In addition, when a forward gate state is not taken into consideration to avoid this problem, there is a problem that the communication resource cannot be effectively used.

Considering above, a communication apparatus according to the present embodiment does not directly use the original gate control list, but uses information obtained by converting the gate control list in advance into a format suitable for hardware processing by software or the like. Specifically, transmission permission information is generated from the original gate control list. The transmission permission information indicates a time permitted to transmit messages, or indicates an amount of transmittable message during the gate open duration. The communication apparatus transmits messages on the basis of the transmission permission information. This makes it possible to finish a transmission control process within a certain period of time and the communication resource is effectively used.

First Embodiment

FIG. 1 is a diagram illustrating an example of a hardware configuration of the communication apparatus according to the present embodiment. The communication apparatus according to the present embodiment includes a memory 1, a host processor 2, a storage 3, a network interface controller 4, and a storage controller 5.

The memory 1 is connected to the host processor 2 via a memory controller in the host processor 2. The memory 1 is implemented by, for example, dynamic random access memory (DRAM) and the like.

The host processor 2 (an example of the communication control device) is connected to the storage controller 5 by using a bus system such as PCI Express (registered trademark). Likewise, the host processor 2 is connected to the network interface controller 4 (an example of the communication control device) by using a bus system such as PCI Express (registered trademark).

The host processor 2 loads, on the memory 1, an image of an execution program stored in the storage 3 and executes processing while reading out instructions and data from the memory 1. The processing is executed by one or more cores included in the host processor 2. Note that, in FIG. 1, while the memory 1 and the host processor 2 are illustrated separately, a configuration implemented by combining the memory 1 and host processor 2 of FIG. 1 is referred to as a host processor (host processor 2, host processor 2-2, and host processor 2-3) in FIG. 2 and subsequent figures.

The storage 3 is implemented by, for example, a hard disk drive (HDD) or solid state drive (SSD). The storage 3 is connected to the storage controller 5 according to standards such as SATA, SAS, and U.2 (SFF-8639). Furthermore, the storage 3 and the storage controller 5 may be integrated with each other.

The network interface controller 4 connects the host processor 2 to a network 200.

The network 200 is, for example, Ethernet (registered trademark). Specifically, the network 200 may be a network corresponding to a standard defined by IEEE 802.1. The standard defined by IEEE 802.1 is, for example, Audio Video Bridging (AVB) standard, Time-Sensitive Networking (TSN) standard, or the like. Furthermore, the network 200 may be any type. The network 200 includes, for example, an office network, a network inside a data center, an in-vehicle network, a network in a factory, a network for a mobile phone base station, a network for a core facility, or the like.

The network interface controller 4 and the storage controller 5 are implemented by, for example, an application specific integrated circuit (ASIC), a field-programmable gate array (FPGA), or the like. Furthermore, the network interface controller 4 and the storage controller 5 may be implemented by a combination of two or three of ASIC, FPGA, and a processor. Furthermore, the network interface controller 4 and the storage controller 5 may include a built-in memory different from the memory 1 described above. Furthermore, the network interface controller 4 and the storage controller 5 may be mounted as a chip separate from the host processor 2, or may be mounted as one chip as a system-on-a-chip (SoC).

Figure 2:
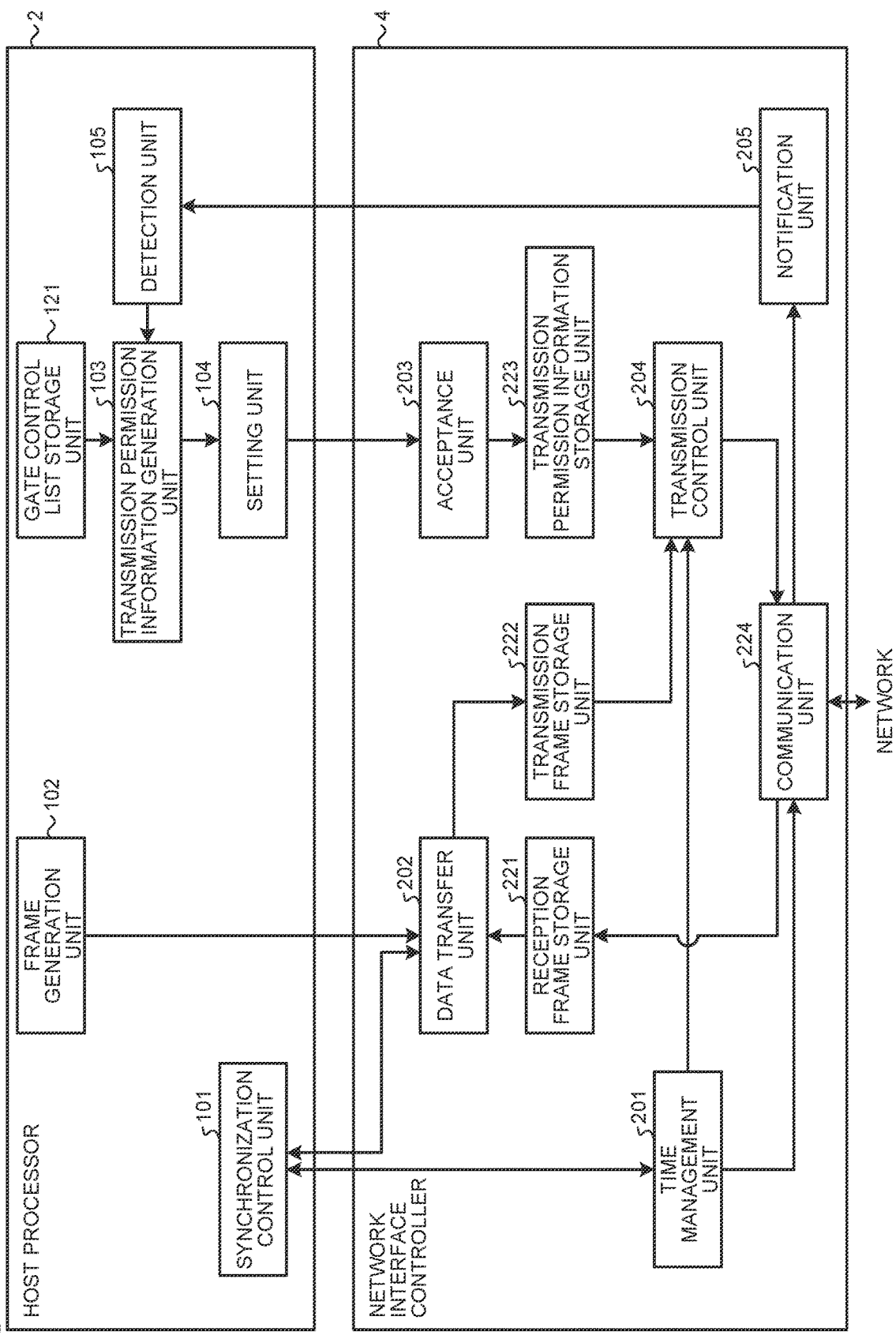
FIG. 2 is a block diagram of the communication apparatus according to the first embodiment.

FIG. 2 is a block diagram illustrating an example of a functional configuration of a communication apparatus 100 according to the present embodiment. Note that FIG. 2 mainly illustrates an example of functional configurations of the host processor 2 (an example of the information processing device) and the network interface controller 4 (an example of the communication control device), which are included in the communication apparatus 100.

As illustrated in FIG. 2, the host processor 2 includes a synchronization control unit 101, a frame generation unit 102, a transmission permission information generation unit 103, a setting unit 104, a detection unit 105, and a gate control list storage unit 121.

The gate control list storage unit 121 stores a gate control list used in transmission control. The gate control list storage unit 121 is implemented by, for example, the memory 1. The gate control list is information used to execute control of Enhancements for scheduled traffic that is defined in IEEE 802.1Q.

The gate control list may be stored in the storage 3 in advance or, for example, may be input from the network 200 by using centralized network configuration (CNC) defined by IEEE 802.1Qcc.

FIG. 3 is a table illustrating an example of a gate control list. The gate control list illustrated in FIG. 3 includes six entries T00 to T05. Each entry includes gate states of queues corresponding to eight traffic classes, and a time interval. TC0 to TC7 indicate traffic classes. For example, TC7 indicates the seventh traffic class. The gate state of each traffic class is indicated by either "o" or "C". An opened gate is indicated by "o". A closed gate is indicated by "C". The gate states each indicates whether transmission in a queue for a traffic class is permitted.

The time interval represents a duration of each entry. In the example of FIG. 3, the time interval of the entry T00 is set to 128 µs. This means that the entry T00 continues for 128 µs. The gate state is maintained during the corresponding time interval sequentially from T00, and the gate state of the gate for each traffic class is switched between "o" and "C" as time passes in the order of T01, T02, T03, T04, and T05. When the last entry (T05 in the example of FIG. 3) is finished, the process returns to the entry T00, and the process is repeated.

Although not illustrated in FIG. 3, in the gate control list, the time (base time) at which gate control is started is also set (stored). The base time is included in the transmission permission information and transmitted to the network interface controller 4. The base time is represented by, for example, the year, the month, the day, the hour, the minute, and the second, but any format may be used as long as the time to start gate control can be identified.

Returning to FIG. 2, the synchronization control unit 101 performs time synchronization with another communication apparatus over the network 200. For example, the synchronization control unit 101 performs time synchronization over the network 200, in accordance with a time synchronization protocol such as IEEE1588 or IEEE802.1AS, and corrects the time information managed by the network interface controller 4 (a time management unit 201 described later).

The frame generation unit 102 generates a frame to be transmitted (a transmission frame). For example, the frame generation unit 102 generates data to be included in the transmission frame and a header and a footer according to a protocol of an upper layer of Ethernet. The frame generation unit 102 is implemented by, for example, a transmission application, a protocol stack, and a device driver, each running on the host processor 2.

While only one frame generation unit 102 is illustrated in FIG. 2, a plurality of the frame generation units 102 may be provided. The frame generation unit 102 sets a traffic class on a transmission frame based on a characteristic or the like of information to be transmitted. When the eight traffic classes are used, values from 0 to 7, for example, are used as identification information for those traffic classes.

The transmission permission information generation unit 103 generates transmission permission information from the gate control list. For example, upon initialization and when a change in link speed is detected by the detection unit 105, the transmission permission information generation unit 103 reads the gate control list from the gate control list storage unit 121 and generates the transmission permission information. The link speed represents the speed of communication over the network 200 by the network interface controller 4 (a communication unit 224 described later). The process of generating the transmission permission information will be described in detail later.

The setting unit 104 transmits the generated transmission permission information to the network interface controller 4 (a reception unit 203 described later).

The detection unit 105 detects the change in the link speed of the network interface controller 4. For example, the detection unit 105 receives a notification from the network interface controller 4 (a notification unit 205 described later) and detects the change in the link speed.

The units described above (the synchronization control unit 101, the frame generation unit 102, the transmission permission information generation unit 103, the setting unit 104, and the detection unit 105) are implemented by, for example, one or more hardware processors. For example, the above-mentioned units may be implemented by causing a hardware processor, such as a central processing unit (CPU), to execute a program, that is, may be implemented by software. Each of the above-mentioned units may be implemented by a processing device such as a dedicated integrated circuit (IC), that is, may be implemented by hardware. The above-mentioned units may be implemented by the software and the hardware in combination. When a plurality of processors is used, each of the processors may implement one of the units or may implement two or more of the units.

As illustrated in FIG. 2, the network interface controller 4 includes the time management unit 201, a data transfer unit 202, the reception unit 203, a transmission control unit 204, the notification unit 205, a reception frame storage unit 221, a transmission frame storage unit 222, a transmission permission information storage unit 223, and the communication unit 224.

The communication unit 224 includes functions called a media access controller (MAC) and PHY, and performs processing necessary to transmit and receive frames according to a data link layer protocol and physical layer protocol in the network 200. For example, the communication unit 224 performs Ethernet data link layer and physical layer processing.

The reception frame storage unit 221 stores reception frames received by the communication unit 224. By using, for example, queues (FIFOs) prepared for the respective traffic classes, the reception frame storage unit 221 sequentially stores data of the reception frames together with information about frame lengths thereof.

The transmission frame storage unit 222 stores transmission frames generated by the frame generation unit 102 of the host processor 2. The transmission frame storage unit 222 uses queues (FIFOs) prepared for the respective traffic classes to sequentially store data and frame lengths of the transmission frames.

The reception frame storage unit 221 and the transmission frame storage unit 222 are implemented by, for example, a static random access memory (SRAM).

The time management unit 201 manages time information. For example, the time management unit 201 manages the time used in the network interface controller 4 and provides the time information to the communication unit 224 and the transmission control unit 204.

Furthermore, when the synchronization control unit 101 performs time synchronization, the communication unit 224 uses time information of the time management unit 201 to add a time stamp to a transmission frame and to acquire a time stamp from a reception frame.

The data transfer unit 202 transfers data to and from the memory 1. For example, the data transfer unit 202 transfers frames between the reception frame storage unit 221 and the memory 1 and between the memory 1 and the transmission frame storage unit 222, by Direct Memory Access (DMA).

In reception processing, the data transfer unit 202 reads out a transfer destination address from a receive descriptor (details will be described later), and writes the data of a reception frame read from a corresponding queue of the reception frame storage unit 221 in an area of the memory 1 specified by the transfer destination address. Then, the data transfer unit 202 writes the length and status of the receive descriptor.

In transmission processing, the data transfer unit 202 reads out a transfer source address and the length, from a transmit descriptor (details will be described later), reads data of the length specified, from an area of the memory 1 specified by the transfer source address, and writes the data of a frame in a corresponding queue of the transmission frame storage unit 222. Then, the data transfer unit 202 writes the status of the transmit descriptor.

Transmission and reception of frames according to the time synchronization protocol are also performed via the data transfer unit 202. For example, the synchronization control unit 101 calculates a time offset with respect to a master connected over the network 200, from a time stamp of each frame, and corrects the time information of the time management unit 201.

Figure 4:
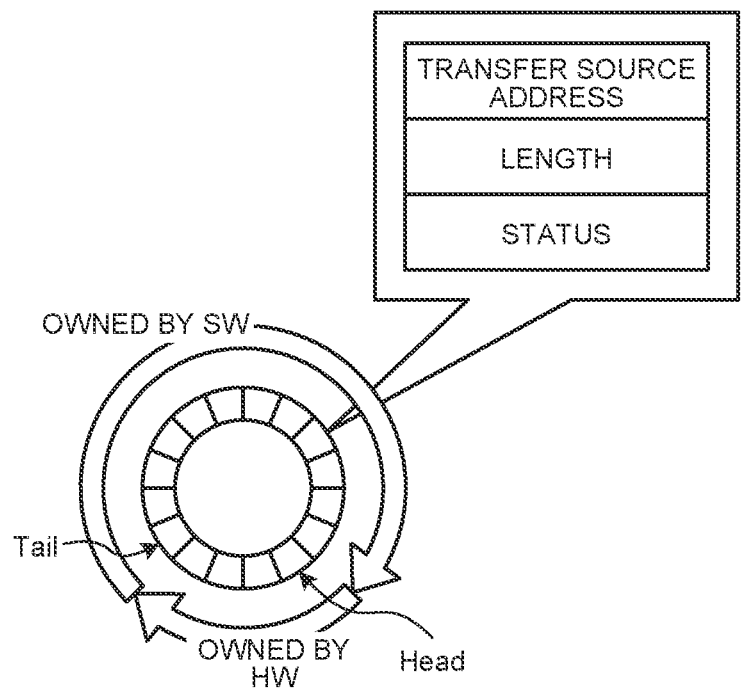
FIG. 4 is a diagram illustrating a configuration example of a transmit descriptor ring.
Figure 5:
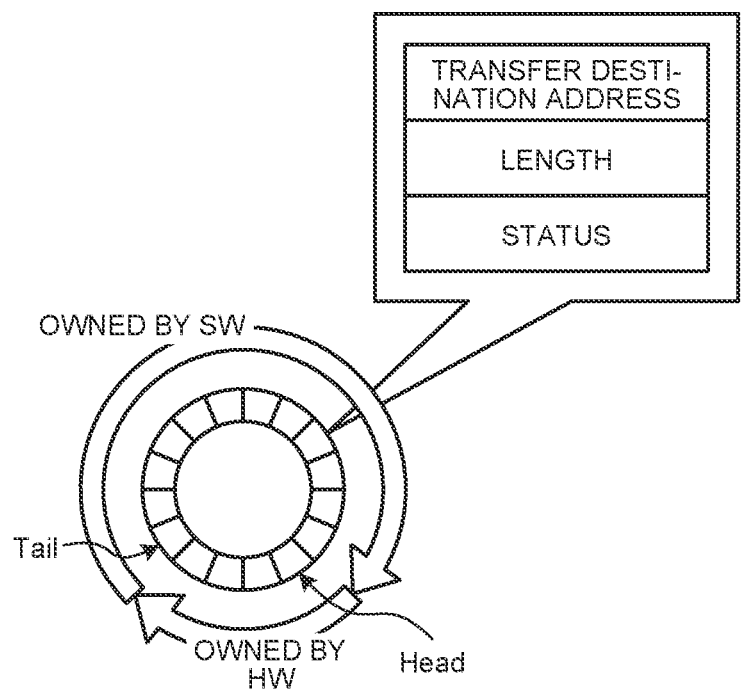
FIG. 5 is a diagram illustrating a configuration example of a receive descriptor ring.

FIGS. 4 and 5 are diagrams illustrating configuration examples of a transmit descriptor ring and a receive descriptor ring.

As illustrated in FIG. 4, transmit descriptors forms a ring buffer and are managed by using two variables, called Head and Tail. As illustrated in FIG. 4, descriptors from Head to Tail-1 represent descriptors owned by HW (hardware), that is, the network interface controller 4. Furthermore, descriptors from Tail to Head-1 represent descriptors owned by SW (software), that is, software (the frame generation unit 102 and the synchronization control unit 101) operating on the host processor 2. The values of the Head and Tail are communicated between the network interface controller 4 and the host processor 2 by using a register interfaces and an interrupt signal.

Each entry (each descriptor) of the transmit descriptor ring includes a transfer source address, length, and status. The transfer source address indicates a starting address indicating the start position of a storage area of a data storage unit (e.g., the memory 1) in which the data of a frame as a transmission target is stored. The length indicates the length of the frame as the transmission target. For the status, information indicating a status of a transmission process is stored.

As illustrated in FIG. 5, each entry (each descriptor) of the receive descriptor ring includes a transfer destination address, length, and status. The transfer destination address indicates a starting address indicating the start position of a storage area of a data storage unit (e.g., the memory 1) in which the data of a frame as a reception target is stored. The length indicates the length of the frame as the reception target. For the status, information indicating a status of a reception process is stored.

The status described above includes, for example, an error bit and a DONE bit. The error bit indicates the presence or absence of a transfer error. The DONE bit indicates that processing in the network interface controller 4 has been finished. When the DONE bit of a transmit descriptor is 1, which indicates that the transmission process is finished. When the DONE bit of a receive descriptor is 1, which indicates that the reception process is finished. The network interface controller 4 writes 1 to each bit (error bit and DONE bit). Then, the frame generation unit 102 or the synchronization control unit 101 checks each bit and writes 0 to each bit to clear each bit.

Returning to FIG. 2, the reception unit 203 receives an input of transmission permission information transmitted by the setting unit 104 of the host processor 2. The reception unit 203 may be configured to set the transmission permission information by using a register defined beforehand. The setting unit 104 may notify of the starting address and length of the transmission permission information that is stored in the memory 1 in a predetermined format by the register, the reception unit 203 accessing the memory 1 and reading the transmission permission information. The set transmission permission information is output to the transmission permission information storage unit 223.

The transmission control unit 204 performs transmission control according to Enhancements for scheduled traffic. For example, the transmission control unit 204 uses time information managed by the time management unit 201, transmission permission information, and the size of the first frame in a queue of each traffic class stored in the transmission frame storage unit 222 to perform transmission control according to Enhancements for scheduled traffic.

Note that a transmission selection algorithm applied to the transmission control may employ any algorithm. For example, the transmission control unit 204 is configured to apply "strict priority" to all traffic classes.

An overview of the transmission control process will be described below. First, the transmission control unit 204 checks which entry of the transmission permission information corresponds to the acquired time information. Then, the transmission control unit 204 calculates a transmittable amount in each queue at the present time, that is, a transmittable amount in each traffic class at the present time. The transmission control unit 204 determines whether the first frame in each queue can be transmitted, on the basis of the transmittable amount. In a case where "strict priority" is applied as the transmission selection algorithm, the transmission control unit 204 selects a traffic class having a maximum value of the identification information of a traffic class from among traffic classes corresponding to queues available for transmission of the first frame. The transmission control unit 204 transmits a frame via the communication unit 224 by using a queue corresponding to the selected traffic class.

The notification unit 205 acquires the link status and the link speed of the communication unit 224 and notifies the host processor 2 (detection unit 105) of the link status and link speed. An interrupt may be activated for performing the notification, or the detection unit 105 may be caused to be operated for polling.

The transmission permission information storage unit 223 stores transmission permission information that is transmitted from the setting unit 104 of the host processor 2 and received by the reception unit 203 so that the transmission control unit 204 can read the transmission permission information. The transmission permission information storage unit 223 is implemented by, for example, SRAM.

The units described above (the time management unit 201, data transfer unit 202, reception unit 203, transmission control unit 204, and notification unit 205) is implemented by, for example, one or more hardware processors. For example, the above-mentioned units may be implemented by causing a hardware processor, such as a CPU, to execute a program, that is, may be implemented by software. Each of the above-mentioned units may be implemented by a processing device such as a dedicated IC, that is, may be implemented by hardware. The above-mentioned units may be implemented by the software and the hardware in combination. When a plurality of processors is used, each of the processors may implement one of the units or may implement two or more of the units.

Figure 6:
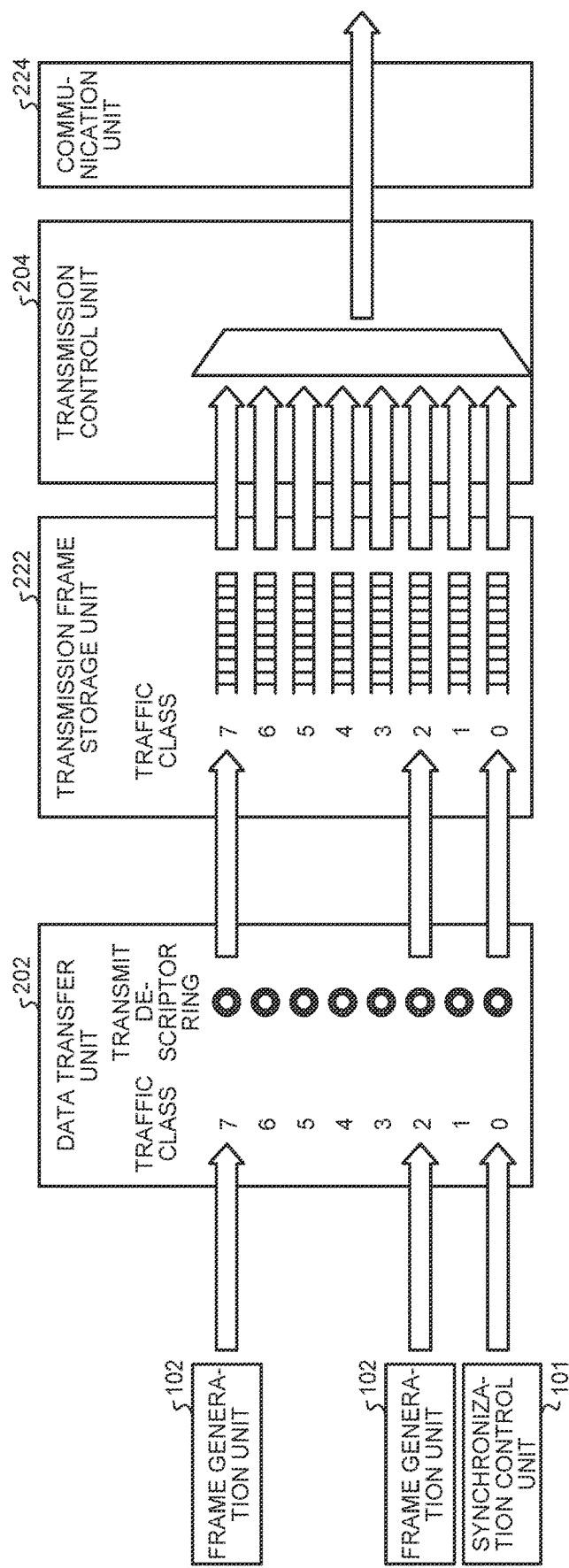
FIG. 6 is a diagram illustrating an overview of the operation of a frame transmission process.

Next, an overview of the operation of a frame transmission process and the operation of a frame reception process will be described with reference to FIGS. 6 and 7. FIG. 6 is a diagram illustrating an overview of the operation of the frame transmission process. The frame transmission process is started from the frame generation unit 102 or synchronization control unit 101. The frame generation unit 102 and the synchronization control unit 101 generate the payload data of a frame and add the header and, if necessary, footer of each protocol to generate the frame. The frame generation unit 102 and the synchronization control unit 101 select a traffic class used for transmitting the frame, based on characteristics of the application. A transmit descriptor in the data transfer unit 202 is prepared, for example, for each traffic class. A frame to which an instruction for transfer is given using the transmit descriptor is read from the memory 1 and transferred to a corresponding queue of the transmission frame storage unit 222. Then, the transmission control unit 204 controls which frame is to be transmitted and transmits the frame by using the communication unit 224. The operation of the transmission control unit 204 will be described in detail later.

Figure 7:
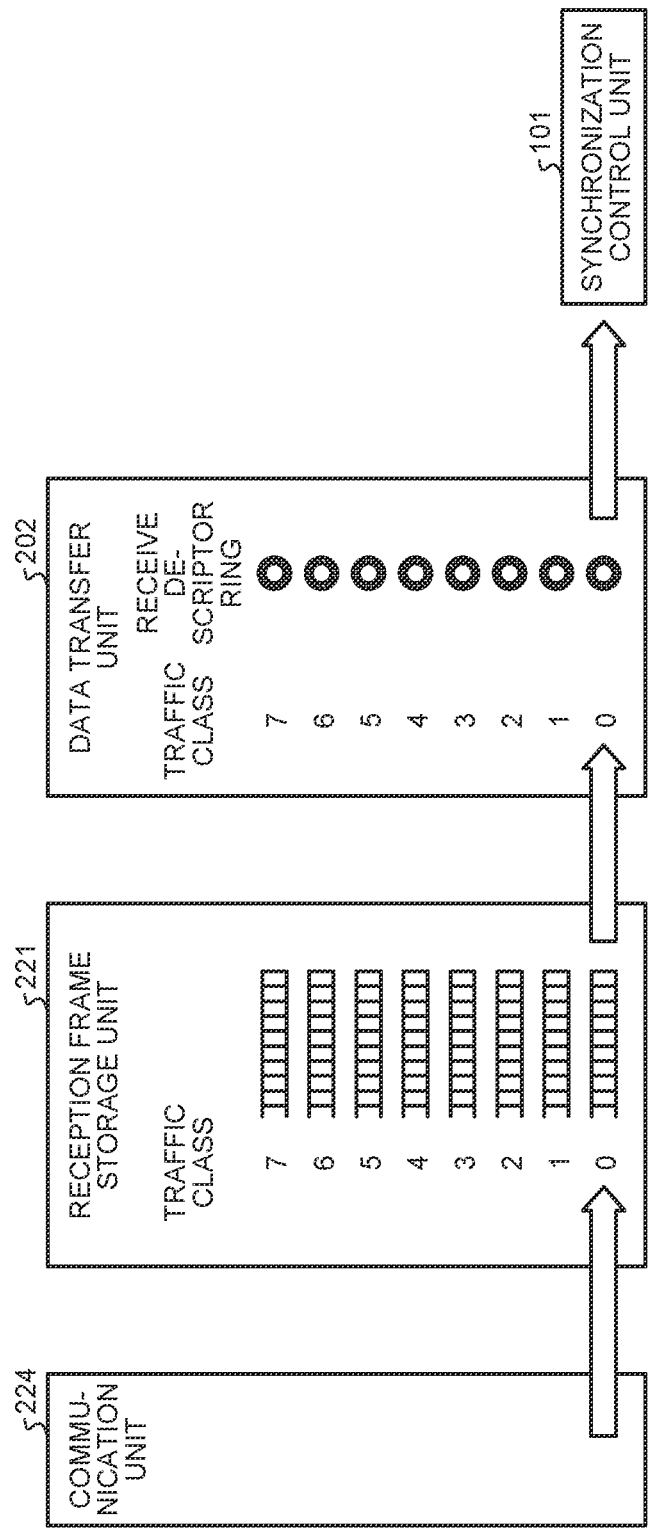
FIG. 7 is a diagram illustrating an overview of the operation of a frame reception process.

FIG. 7 is a diagram illustrating an overview of the operation of the frame reception process. The communication unit 224 assigns the reception frame to a traffic class based on: the presence or absence of a virtual local area network (VLAN) tag in a reception frame, and a priority code point (PCP) value in a VLAN tag when the VLAN tag exists. The reception frames are sequentially stored in corresponding queues of the reception frame storage unit 221. After that, the reception frame is stored in a memory address of the memory 1 set in a corresponding receive descriptor in the data transfer unit 202 and is passed to the synchronization control unit 101 or the like.

Figure 8:
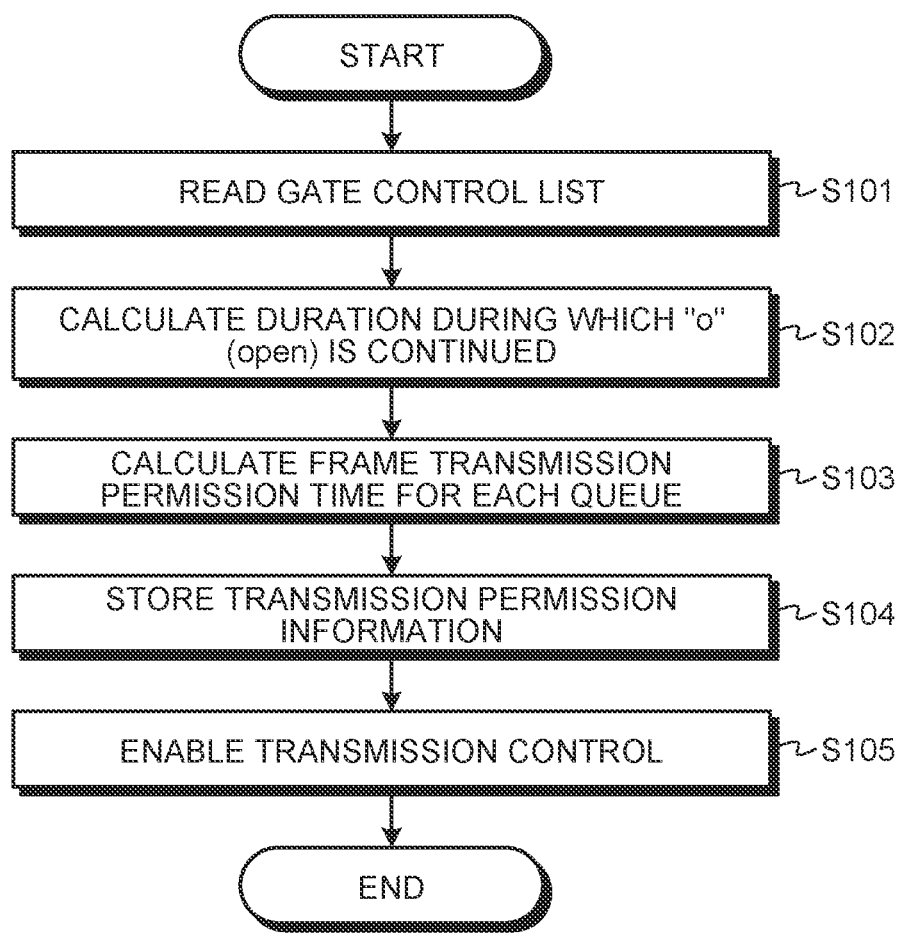
FIG. 8 is a flowchart of a transmission permission information generation process.

Next, a transmission permission information generation process will be described with reference to FIG. 8. FIG. 8 illustrates an example of a flowchart of the transmission permission information generation process. The transmission permission information generation process is performed, for example, when the gate control list is set and when a change in link speed is detected by the detection unit 105.

The transmission permission information generation unit 103 reads a gate control list from the gate control list storage unit 121 (Step S101). Here, for example, it is assumed that the gate control list illustrated in FIG. 3 is obtained.

The transmission permission information generation unit 103 calculates a duration (a continuous open duration) during which the gate state "o" of the gate control list is continued, for each traffic class (Step S102).

FIG. 9 is a diagram illustrating an example of the calculated continuous open duration. For example, in the entry T02 for the traffic class TC7, the gate state continues "o" through T02 to T03 and changes to "C" in T04. The time intervals for T02 and T03 are 512 μs and 128 μs, and thus, "o" continues for (512+128=) 640 μs, from the beginning of T02. Likewise, the gate state is changed to "C" in T04, and thus, "o" continues for 128 μs in T03. Note that after the last entry, the gate control list returns to the first entry. In T05, "o" continues through T05 to TOO, and thus, "o" continues for (512+128=) 640 μs. When the gate state is always "o" as in the traffic class TC0, the continuous open duration is infinite (∞) because "o" continues unless the gate control list is changed.

Returning to FIG. 8, the transmission permission information generation unit 103 generates transmission permission information by using the continuous open duration calculated in this way. For example, the transmission permission information generation unit 103 calculates a time period in which a frame is permitted to be transmitted in each queue (a frame transmission permission time) for each relative time (reference time and reference interval) to the start (base time) of the gate control list (Step S103). The transmission permission information generation unit 103 generates the transmission permission information in which the frame transmission permission time is defined, for each relative time range. FIGS. 10 to 15 are tables each illustrating an example of generated transmission permission information.

The transmission permission information illustrated in FIG. 10 stores the continuous open duration, that is, the time period in which a frame is permitted to be transmitted (frame transmission permission time), for a traffic class, at gate switching timing. Note that the time is represented by a relative value to the start time of the gate control list. The transmission control unit 204 uses such transmission permission information to perform transmission control.

Note that FIG. 10 illustrates an example of the transmission permission information that stores the continuous open durations for all traffic classes at the gate switching timing. On the other hand, FIG. 11 illustrates an example of the transmission permission information that stores a time only when a gate is newly opened. In this example, the entry in the fourth line can be deleted.

In a case where the link speed is obtained, the continuous open duration can be converted into the amount of transmittable message (e.g., number of bytes). FIGS. 12 and 13 illustrate examples of transmission permission information, in which each time indicated in FIGS. 10 and 11, respectively, is represented in bytes when the link speed is 1 Gbps. The transmission permission information that is represented in bytes makes it possible to reduce the amount of calculation. Furthermore, the relative value to the start may be expressed in bytes instead of the time. FIGS. 14 and 15 illustrate examples of transmission permission information having such a form. Note that in a case where the transmission permission information is not represented in bytes, the link speed does not need to be detected, and thus, the host processor 2 does not need to include the detection unit 105.

Returning to FIG. 8, the setting unit 104 transmits generated transmission permission information to the network interface controller 4 and causes the transmission permission information storage unit 223 of the network interface controller 4 to store the generated transmission permission information (Step S104). When the transmission permission information is stored, for example, the transmission control unit 204 enables the transmission control (Step S105).

Figure 16:
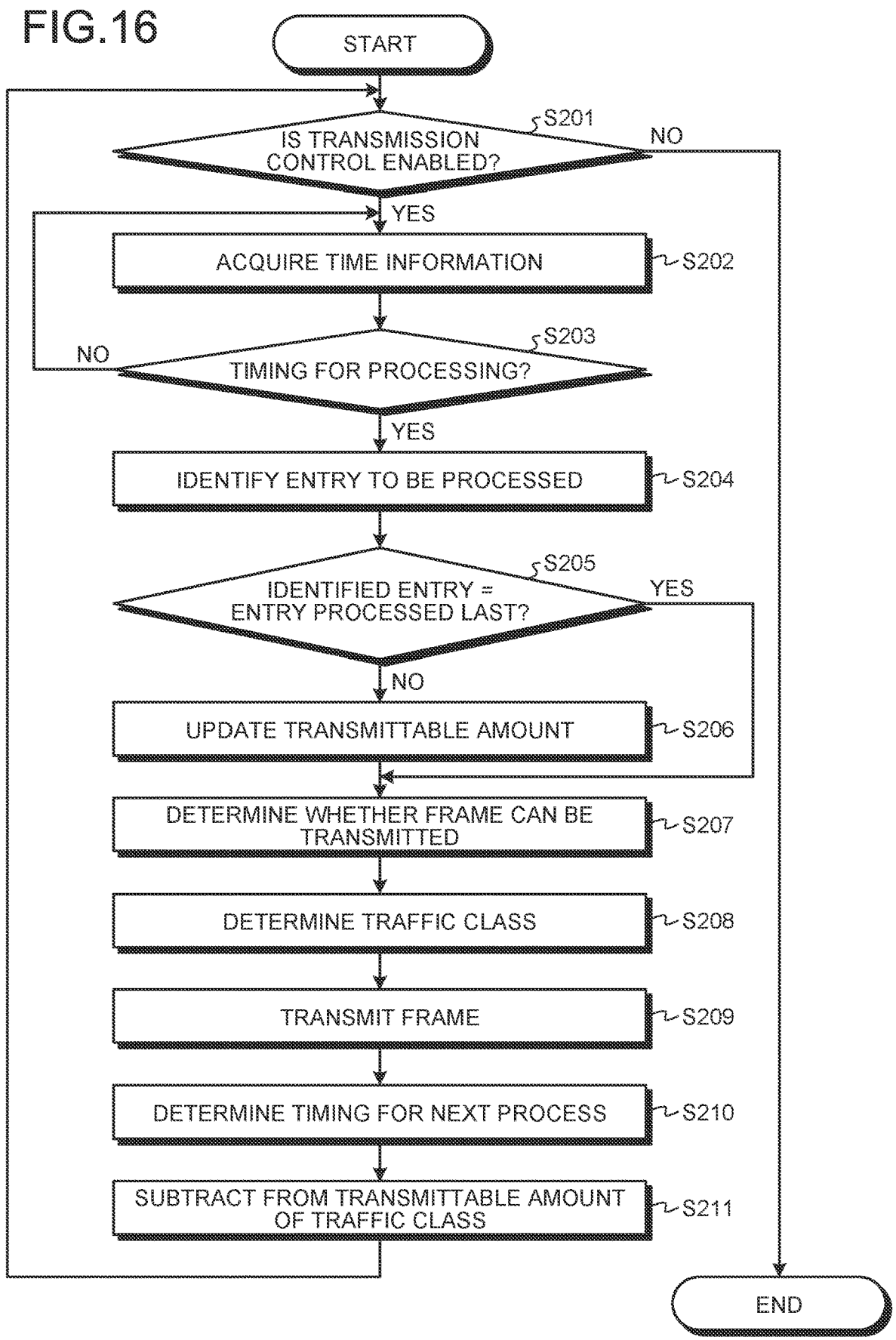
FIG. 16 is a flowchart of a transmission control process.

Next, the transmission control process executed by the transmission control unit 204 will be described with reference to FIG. 16. FIG. 16 is a diagram illustrating an example of a flowchart of the transmission control process.

First, the transmission control unit 204 determines whether transmission control is enabled (Step S201). When, for example, no transmission permission information is set, or no correct transmission permission information is set due to a change in link speed, the transmission control is disabled. When the transmission control is not enabled (is disabled) (Step S201: No), the subsequent process is not executed and the process is finished.

When the transmission control is enabled (Step S201: Yes), the transmission control unit 204 acquires time information from the time management unit 201 (Step S202). The transmission control unit 204 determines whether the time indicated by the time information is the timing for processing (Step S203). The timing for processing refers to a timing to start transmission of the next frame. This timing is determined, for example, in the previous frame transmission. Furthermore, the timing is represented in time or bytes. The initial value is set to a value at which processing is started immediately.

When it is not the timing for processing (Step S203: No), the process returns to Step S202 and the process is repeated. When it is the timing for processing (Step S203: Yes), the transmission control unit 204 uses the time information acquired from the time management unit 201, the base time indicated by the transmission permission information, and a maximum value (maximum time) within a time range indicated by the transmission permission information, and identifies an entry of the transmission permission information that is to be referred to (Step S204).

The transmission control unit 204 determines whether the identified entry is the same as an entry processed last (Step S205). When the entries are different (Step S205: No), that is, at timing at which the entries are switched, a transmittable amount stored in a traffic class is updated (Step S206). The transmittable amount may be time or bytes. Here, it is assumed that the transmittable amount is managed together with the updated timing.

An update example when the transmission permission information of FIG. 10 is used will be described hereinafter. For example, it is assumed that the time indicated by the time information is 768 µs after the base time. In this condition, the transmission control unit 204 identifies the entry in the fourth line as a reference entry. The transmission control unit 204 sets the frame transmission permission time of each queue set in this entry as the transmittable amount (time), and records the time that is 768 µs after the base time, as the transmittable amount update time. The transmittable amounts in the traffic classes 7, 6, 4, and 2 are each set to 128 µs, and the transmittable amounts in other traffic classes are each set to 0 µs. Furthermore, the time after 768 µs is recorded as the transmittable amount update time for all traffic classes. In other words, in a case where the transmission permission information of FIG. 10 is used, the transmittable amounts in all queues are overwritten with the frame transmission permission time set in a new entry, when entries are switched. In addition, all the transmittable amount update time is also overwritten.

An update example in use of the transmission permission information of FIG. 11 will be described hereinafter. For example, it is assumed that the time indicated by the time information is 256 µs after the base time. In this condition, the transmission control unit 204 identifies the entry in the third line as a reference entry. The transmission control unit 204 sets the frame transmission permission time of a queue to which a value is set of the queues set in this entry, as the transmittable amount (time), and records the time that is 256 µs after the base time, as the transmittable amount update time. For a queue to which no value is set, the transmittable amount and transmittable amount update time are not updated. In this example, only the transmission permission time in the traffic class 7 is updated. Specifically, 640 µs that is set as the frame transmission permission time is set as the transmittable amount, and the time that is 256 µs after the base time is recorded. The transmittable amount and transmittable amount update time in other traffic classes are not updated. In other words, in a case where the transmission permission information of FIG. 11 is used, the transmittable amount and the transmittable amount update time are overwritten only in a traffic class in which the frame transmission permission time is set for a new entry, when entries are switched.

Returning to FIG. 16, the transmission control unit 204 acquires the size of the first frame in each traffic class of the transmission frame storage unit 222 to determine whether a frame can be transmitted for each traffic class (Step S207). The transmission control unit 204 may determine whether a frame can be transmitted in consideration of media-dependent overhead.

A determination example when the transmission permission information of FIG. 10 is used will be described hereinafter. For example, it is assumed that the time indicated by the time information is 800 µs after the base time. In this condition, in determining whether transmission is permitted in the traffic class 7 (TC7), the transmission control unit 204 calculates first the remaining frame transmission permission time at the time indicated by the time information. This value is calculated by subtracting the time corresponding to a difference between the time indicated by the time information (800 µs) and the time at which the transmittable amount is updated (transmittable amount update time) 768 µs, from the transmittable amount. In this example, the transmittable amount (time) is (128−(800−768) =) 96 µs. When the time required for frame transmission is equal to or less than this value, the transmission control unit 204 determines that the frame can be transmitted. When the time required for frame transmission is smaller than this value, the transmission control unit 204 determines that the frame cannot be transmitted. The transmission control unit 204 may add media-dependent overhead to the time required to transmit the frame.

A determination example when the transmission permission information of FIG. 11 is used will be described hereinafter. For example, in a case where the transmission permission information of FIG. 11 is used, it is assumed that the time indicated by the time information is 800 µs after the base time. In this condition, in determining whether transmission is permitted in the traffic class 7 (TC7), the transmission control unit 204 calculates first the remaining frame transmission permission time at the time indicated by the time information. This value is calculated by subtracting the time corresponding to a difference between the time (800 µs) indicated by the time information and the time 256 µs at which the transmittable amount is updated (a transmittable amount update time), from the transmittable amount. In this example, the transmittable amount (time) is (640−(800−256) =) 96 µs. When the time required for frame transmission is equal to or less than this value, the transmission control unit 204 determines that the frame can be transmitted. When the time required for frame transmission is smaller than this value, the transmission control unit 204 determines that the frame cannot be transmitted. The transmission control unit 204 may add media-dependent overhead to the time required to transmit the frame.

Note that, in the transmission permission information of FIGS. 10 and 11, it is assumed that the time indicated by the time information is 1536 µs after the base time. As the gate control list, this works in the same way as the elapsed time from the base time is 0 µs. In this condition, due to switching of reference entries, the transmittable amount is set to 128 µs and the transmittable amount update time is set to 0 µs for the transmission permission information of both FIGS. 10 and 11, in the traffic class 7. The frame transmission permission time used to determine whether transmission is permitted at this time is calculated by subtracting the time corresponding to a difference between the time indicated by the time information (0 µs) and the time at which the transmittable amount is updated (transmittable amount update time) 0 µs, from the transmittable amount. In this example, the transmittable amount (time) is (128−(0−0)=) 128 µs. When the time required for frame transmission is equal to or less than this value, the transmission control unit 204 determines that the frame can be transmitted.

Note that, in the case of the example of FIG. 10, the transmittable amount is updated every time entries are switched, and thus, it is not necessary to record the transmittable amount update time. In this configuration, the start time of the current entry is preferably regarded as the transmittable amount update time.

Figure 17:
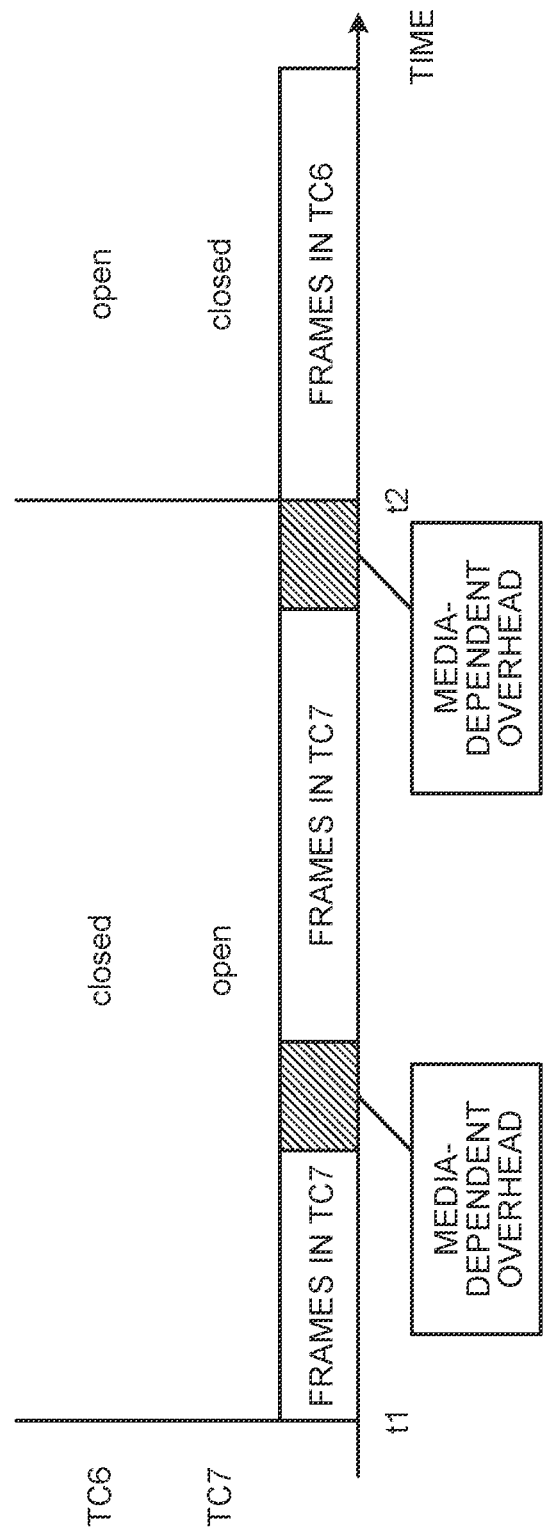
FIG. 17 is a diagram illustrating an example of media-dependent overhead.

FIG. 17 is a diagram illustrating an example of media-dependent overhead. The media-dependent overhead includes, for example, an inter-frame gap (IFG) and a preamble and start frame delimiter (SFD) of the next frame, in size. When a total value of the frame size (including FCS) and the media-dependent overhead is equal to or less than the transmittable amount, the transmission control unit 204 determines that a frame can be transmitted. Note that when the transmission permission information is represented in time, the transmission control unit 204 makes a determination after converting a frame size or the like into time by using the link speed.

The transmission control unit 204 determines, in accordance with a transmission selection algorithm, a traffic class whose first frame is to be transmitted out of traffic classes for which transmission is permitted (Step S208). When "strict priority" is used as the transmission selection algorithm, the transmission control unit 204 selects a traffic class having the highest priority, that is, a traffic class having a maximum value of identification information, out of the traffic classes for which transmission is permitted.

The transmission control unit 204 transmits the first frame stored in a queue of the selected traffic class via the communication unit 224 (Step S209).

The transmission control unit 204 determines the timing of performing a next transmission control process (Step S210). For example, the transmission control unit 204 determines timing delayed by a time required for frame transmission this time as the timing for performing the next transmission control process.

The transmission control unit 204 subtracts an amount (time or bytes) required for frame transmission from the transmittable amount in the traffic class (queue) used for the frame transmission (Step S211), and finishes the transmission control process.

As described above, the communication apparatus according to the present embodiment has the simplified hardware configuration or software processing but makes it possible to accurately operate according to the gate control list and effectively use a given communication resource. Furthermore, it is possible to give the transmission control process real-time performance (performance capable of finishing the process within a predetermined time).

Second Embodiment

In the present embodiment, an example will be described in which the time range (time interval) determining the transmission permission time of the transmission permission information is represented in the number of clock cycles. The number of clock cycles is the number of clock cycles based on an operation clock of the transmission control unit.

Figure 18:
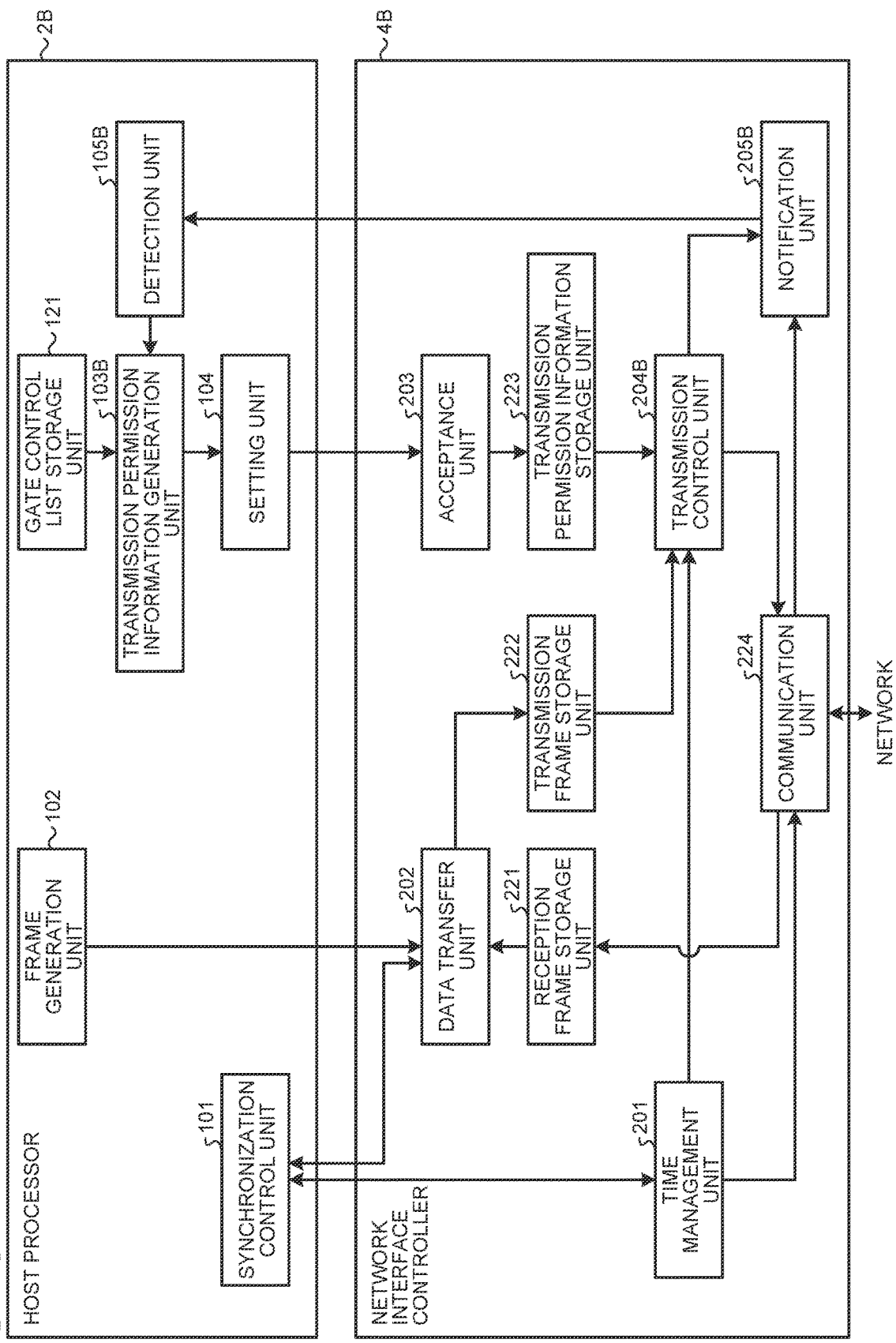
FIG. 18 is a block diagram of a communication apparatus according to a second embodiment.

FIG. 18 is a block diagram illustrating an example of a functional configuration of a communication apparatus (a host processor 2B and a network interface controller 4B) according to a second embodiment.

As illustrated in FIG. 18, the host processor 2B of the present embodiment is different from the host processor 2 of the above embodiment in functions of a transmission permission information generation unit 103B and a detection unit 105B. In addition, the network interface controller 4B according to the present embodiment is different from the network interface controller 4 according to the above embodiment in the functions of a transmission control unit 204B and a notification unit 205B. The other configurations are the same as those of FIG. 2, and thus denoted by the same reference numerals, and the description thereof will be omitted.

The transmission permission information generation unit 103B is different from the transmission permission information generation unit 103 according to the above embodiment in the following functions.

The transmission permission information is generated when a change in operation speed information is detected, in addition to when the change in link speed is detected.

The transmission permission information is generated in which the time interval is represented in the number of clock cycles of the transmission control unit 204B.

The operation speed information includes at least one of clock information and bit width information. The clock information indicates a clock frequency or the clock cycles (clock periods) required for the network interface controller 4B (a transmission control unit 204B) to perform the transmission control process. The bit width information indicates a bit width of a data bus outputting data to the communication unit 224 through the transmission control process by the network interface controller 4B (transmission control unit 204B). Note that the link speed, the clock information, and the bit width of the data bus may be stored in the host processor 2B in advance.

As described above, in a case where the link speed or the operation speed information is obtained, the continuous open duration can be represented by the amount of data (e.g., the number of bytes) of the transmittable message. The amount of data of the transmittable message may be represented in bits instead of bytes. The same applies to the first embodiment.

In a case where the link speed is obtained, a transmission permission information generation unit 103B calculates the number of transmittable bits that can be used to transmit one or more frames on the basis of the continuous open duration by using the link speed. For example, when the link speed is 100 Gbps and the continuous open duration is 640 μs, the number of transmittable bits is calculated as 100000000000×640/1000000=64000000 bits.

In a case where the operation speed information is obtained, the transmission permission information generation unit 103B calculates the number of transmittable bits on the basis of the continuous open duration by using the operation speed information. For example, in a case where an output of the transmission control unit 204B has a clock frequency of 161.1328125 MHz, a bit width of 640 bits, and a continuous open duration of 640 μs, the number of transmittable bits is calculated as 161132812.5×640×640/1000000=66000000 bits.

The detection unit 105B is different from the detection unit 105 according to the above embodiment in that a function of detecting the change in the operation speed information is added in addition to the detection of the change in the link speed. For example, the detection unit 105B receives a notification from the network interface controller 4B (notification unit 205B) and detects the change in the link speed and the operation speed information. For example, in the present embodiment, the transmission permission information generation processing as illustrated in FIG. 8 is also performed, when the change in the operation speed information is detected by the detection unit 105B.

The notification unit 205B is different from the notification unit 205 according to the above embodiment in that a function is provided to acquire the operation speed information (clock information and bit width information) of the transmission control unit 204B and notify the host processor 2B (detection unit 105B) of the operation speed information.

The transmission control unit 204B is different from the transmission control unit 204 according to the above embodiment in that transmission control is performed by using the transmission permission information generated by the transmission permission information generation unit 103B and represented by the clock cycle of the transmission control unit 204B. For example, the transmission control unit 204B determines whether transmission of a message (frame) is permitted, on the basis of the transmission permission information, at each operation clock of the transmission control unit 204B and performs control of transmission of the transmittable message.

FIGS. 19 and 20 are tables each illustrating an example of transmission permission information generated by the transmission permission information generation unit 103B according to the present embodiment. FIGS. 19 and 20 each illustrate an example of frame transmission permission information in which the values of the time intervals are represented in the numbers of clock cycles and a transmittable amount per frame is represented by the numbers of bits (the number of transmittable bits).

Note that FIG. 19 illustrates an example of the transmission permission information that stores the number of transmittable bits, for all traffic classes at the gate switching timing. On the other hand, FIG. 20 illustrates an example of the transmission permission information that stores the number of transmittable bits, only when a gate is newly opened.

In the present embodiment, the time range (time interval) determining the transmission permission time is represented in the number of clock cycles. The number of clock cycles indicates that how many times the clock of the transmission control unit 204B operates during the time interval of each entry. For example, when the transmission control unit 204B operates at 156.25 MHz, one clock cycle is (1/156.25=) 6.4 ns. The time interval of 128 µs is (128 µs/6.4 ns=) 20,000 in the clock cycles. The number of transmittable bits is a value obtained by multiplying a value (in FIG. 12 and the like) represented in bytes by 8.

Figure 21:
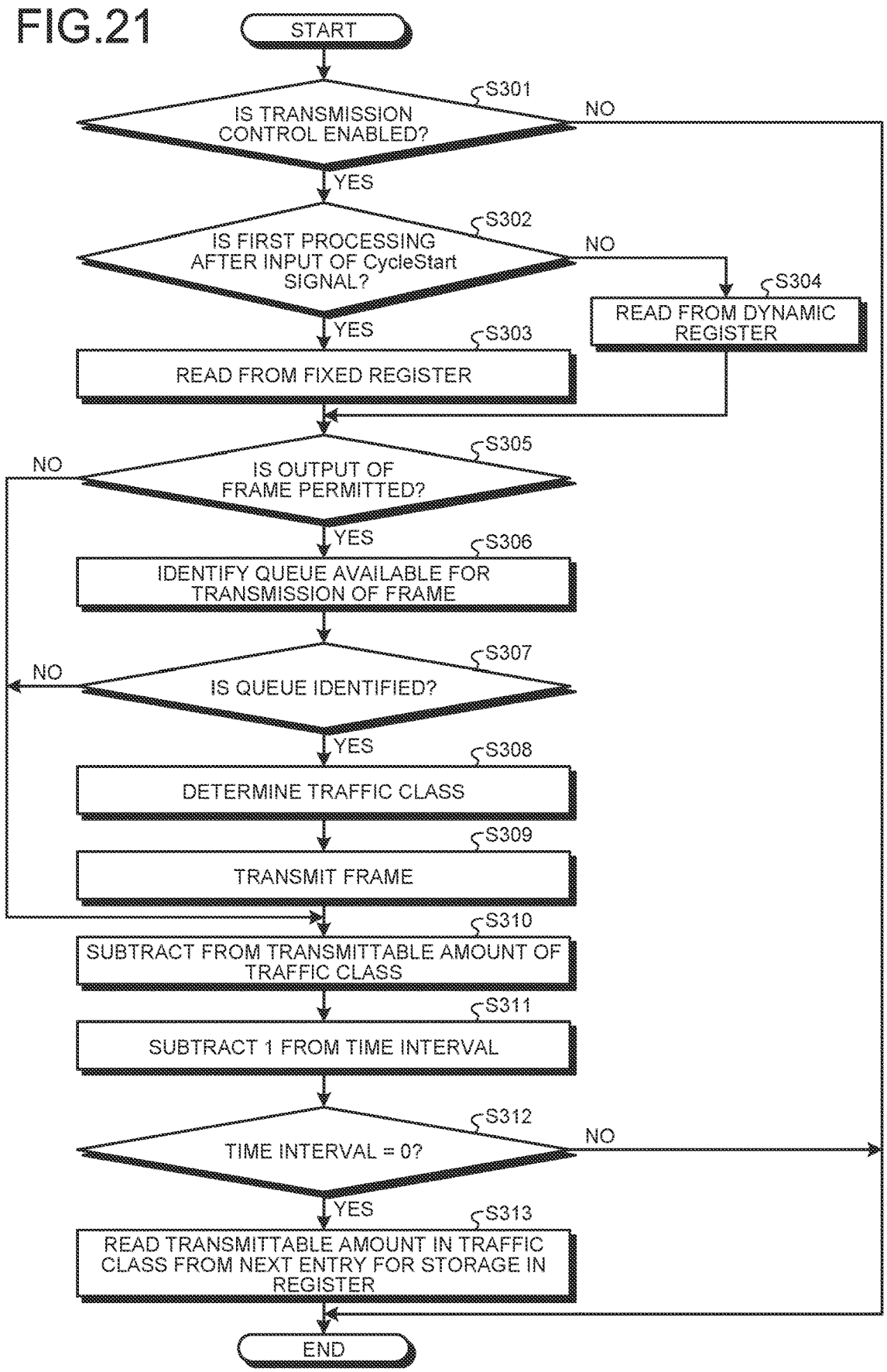
FIG. 21 is a flowchart of a transmission control process.

Next, the transmission control process executed by the transmission control unit 204B will be described with reference to FIG. 21. FIG. 21 is a diagram illustrating an example of a flowchart of the transmission control process according to the present embodiment.

Here, the transmission control unit 204B is configured to store the transmission permission information read from the transmission permission information storage unit 223 in a register provided in the transmission control unit 204B and perform transmission control. For example, a fixed register (equivalent to a fixed cache space of a cache unit which is described later) that is a register holding the first entry and a dynamic register (equivalent to a variable cache space of the cache unit which is described later) that is a register holding a current value are prepared so that the fixed register and the dynamic register each hold the transmittable amount (the number of transmittable bits) and the time interval (the number of clock cycles) in each traffic class. In addition, in preparation for switching the transmission permission information, two sets of these registers may be prepared so that a register for use and a register for rewriting may be switched and used. Note that the transmission control unit 204B is assumed to operate, for example, at an operation frequency of 156.25 MHz.

For example, in initialization such as for setting new transmission permission information, the transmission control unit 204B stores, in the fixed register, the transmittable amount (the number of transmittable bits) and the time interval (the number of clock cycles) in each traffic class in the first entry that are read from the transmission permission information storage unit 223. Then, the transmission control process illustrated in FIG. 21 is performed every clock cycle. Operations in steps illustrated in FIG. 21 may be performed in parallel, and the process is not necessarily completed in the order described in the flowchart.

First, the transmission control unit 204B determines whether the transmission control is enabled (Step S301). In response to determining that the transmission control is not enabled (is disabled) (Step S301: No), the subsequent process is not executed and the process is finished. Note that, when transmission control is not enabled, the transmission control may be performed in accordance with the state (open or close) determined in advance for each traffic class, without performing switching of the gates according to the time.

In response to determining that the transmission control is enabled (Step S301: Yes), the transmission control unit 204B determines whether the processing is the first processing after a CycleStart signal is input from the time management unit 201 (Step S302). The CycleStart signal is a signal generated on the basis of the time from the time management unit 201, and is used for an operation of returning the gate control list to the first entry.

In response to determining that the processing is the first processing (Step S302: Yes), the transmission control unit 204B reads the transmittable amount (the number of transmittable bits) and the time interval (the number of clock cycles) in each traffic class stored in the fixed register, for use in subsequent processing (Step S303). On the other hand, in response to determining that the processing is not the first processing (Step S302: No), the transmission control unit 204B reads the transmittable amount (the number of transmittable bits) and the time interval (the number of clock cycles) in each traffic class stored in the dynamic register, for use in subsequent processing (Step S304).

On the basis of the read information, the transmission control unit 204B determines whether output of a frame to the communication unit 224 is permitted (Step S305). For example, the transmission control unit 204B confirms whether a transmission frame reception state in the communication unit 224 indicates "possible" and a preceding frame is not being output (output of the preceding frame is not completed).

In response to determining that the frame is allowed to be output (Step S305: Yes), the transmission control unit 204B identifies a queue available for transmission of the frame (Step S306). For example, the transmission control unit 204B identifies the queue available for transmission of the frame, from the queues, on the basis of the size of the first frame of the queue, and the number of transmittable bits of each queue read in Step S303 or S304.

More specifically, the transmission control unit 204B subtracts a value obtained by adding the size of the first frame of the queue and the media-dependent overhead, from the number of transmittable bits, and determines that transmission is possible when the calculated value is 0 or more. For example, it is assumed that the number of transmittable bits in a certain queue is 768000 bits, the size of the first frame of the queue (including FCS) is 1522 bytes (12176 bits), and the media-dependent overhead is 20 bytes (160 bits). In this case, the calculated value is (768000−(12176+ 160)) 755664 bits, which has a value of 0 or more. Therefore, the transmission control unit 204B determines that the queue is available for transmission of the frame.

Meanwhile, it is assumed that the number of transmittable bits of a certain queue is 12000 bits, the size of the first frame of the queue (including FCS) is 1522 bytes (12176 bits), and the media-dependent overhead is 20 bytes (160 bits). In this case, the calculated value is (12000−(12176+160)=)−336 bits, which has a negative value. Therefore, the transmission control unit 204B determines that this queue is not available for transmission of the frame.

The transmission control unit 204B performs this processing for each queue and identifies a queue that is available for transmission of the frame.

Next, the transmission control unit 204B determines whether one or more queues available for transmission of the frame have been identified (Step S307). In response to determining that the queues available for transmission of the frame is identified (Step S307: Yes), the transmission control unit 204B determines a traffic class for transmission of the frame, according to the transmission selection algorithm set for each queue (Step S308). Each traffic class corresponds to each queue, and thus, determining the traffic class corresponds to determining the queue.

For example, in a case where "strict priority" is set as the transmission selection algorithm, the transmission control unit 204B selects a traffic class having a maximum value of the identification information of a traffic class from among traffic classes corresponding to queues available for transmission of the first frame.

Then, the transmission control unit 204B starts outputting the first frame of the queue corresponding to the selected traffic class to the communication unit 224, and transmits the frame (Step S309).

After transmission of the frame, when no frame can be output (Step S305: No) or when no transmittable queue is identified (Step S307: No), the transmission control unit 204B stores a value obtained by subtracting a value corresponding to one clock cycle from the number of transmittable bits of each traffic class, in the dynamic register (Step S310).

The value to be subtracted (subtraction value) is calculated on the basis of the operation speed information of the transmission control unit 204B (obtained from a combination of the clock information and the bit width of the data bus). When an output speed of the transmission control unit 204B is the same as an output speed (the link speed) of the communication unit 224, the link speed of the communication unit 224 may be used instead of the output speed.

When the transmission control unit 204B operates at 10 Gbps and outputs the frame to the communication unit 224 at 156.25 MHz using a 64-bit bus width, the transmission control unit 204B subtracts a value the same as the bit width (=64 bits) of the data bus from the number of transmittable bits of each queue every clock cycle. The subtraction value may be configured to be added to the transmission permission information and notified of from the host processor 2B.

When the number of transmittable bits in the transmission permission information generated on the basis of the operation speed information of the transmission control unit 204B is subtracted, the transmission control unit 204B subtracts 640 bits, which is the bit width of the output of the transmission control unit 204B, every clock cycle.

Furthermore, for example, when the link speed of the communication unit 224 of the transmission control unit 204B is 100 Gbps, the number of transmittable bits is subtracted on the basis of this information, but the operating frequency of the transmission control unit 204B and the bus width do not match. In such a case, the subtraction value may be changed as illustrated in FIGS. 22 and 23.

FIG. 22 illustrates an example in which, for example, in one cycle of 33 clock cycles, the subtraction value is set to 640 in the first clock cycle and the subtraction value is set to 620 in the remaining 32 clock cycles. FIG. 23 illustrates an example in which the subtraction value is set to 621 in the first 20 clock cycles and the subtraction value is set to 620 in the remaining 13 clock cycles.

The host processor 2B may notify the transmission control unit 204B of information about the subtraction value to be changed (subtraction value information). The subtraction value information includes information, that is, a first subtraction value and the number of repetitions thereof, and a second subtraction value and the number of repetitions thereof. The subtraction value information is not limited thereto, and may be information of any format as long as the subtraction value information can identify the subtraction value for each position of the operation clock in a cycle of a predetermined number of operation clock cycles.

Returning to FIG. 21, the transmission control unit 204B stores, in the dynamic register, a value obtained by subtracting 1 from the value of the time interval (the number of clock cycles) (Step S311). The transmission control unit 204B determines whether the value of time interval (the number of clock cycles) becomes zero (Step S312).

In response to determining that the value of time interval (the number of clock cycles) becomes zero (Step S312: Yes), the transmission control unit 204B reads the number of transmittable bits and the time interval (the number of clock cycles) of each traffic class, from a subsequent entry of the transmission permission information, and stores the read number and time interval in the dynamic register (Step S313). Note that, in a case where it takes more than one cycle to read the number of transmittable bits and the time interval (the number of clock cycles) of each traffic class, from the subsequent entry of the transmission permission information, the transmission control unit 204B may read the number and time interval from the subsequent entry when the number of cycles is equal to or less than the number of cycles required. In other words, in a case where it takes three cycles for reading, the transmission control unit 204B may start the process of reading the subsequent entry when the time interval (number of clock cycles) becomes equal to or less than a predetermined value, in such a manner that the next entry is read when the number of cycles is equal to or less than three. For incompletion of the reading due to a constant cycle delay, the transmission control unit 204B may prepare two sets of registers to hold the number of transmittable bits and the time interval (the number of clock cycles) of each traffic class, for switchable use.

In response to determining that the value of time interval (the number of clock cycles) does not become zero after the value obtained by subtracting 1 from the value of the time interval (the number of clock cycles) is stored in the dynamic register (Step S312: No), the transmission control process is finished.

As described above, the second embodiment enables the transmission control using the transmission permission information in which the time interval is represented in clock cycles of the transmission control unit.

Hereinafter, modifications applicable to the above embodiments (first embodiment and second embodiment) will be described. Hereinafter, a modification based on the first embodiment (FIG. 2 and the like) will be described, but a similar method is applicable to the second embodiment (FIG. 18 and the like).

First Modification

Figure 24:
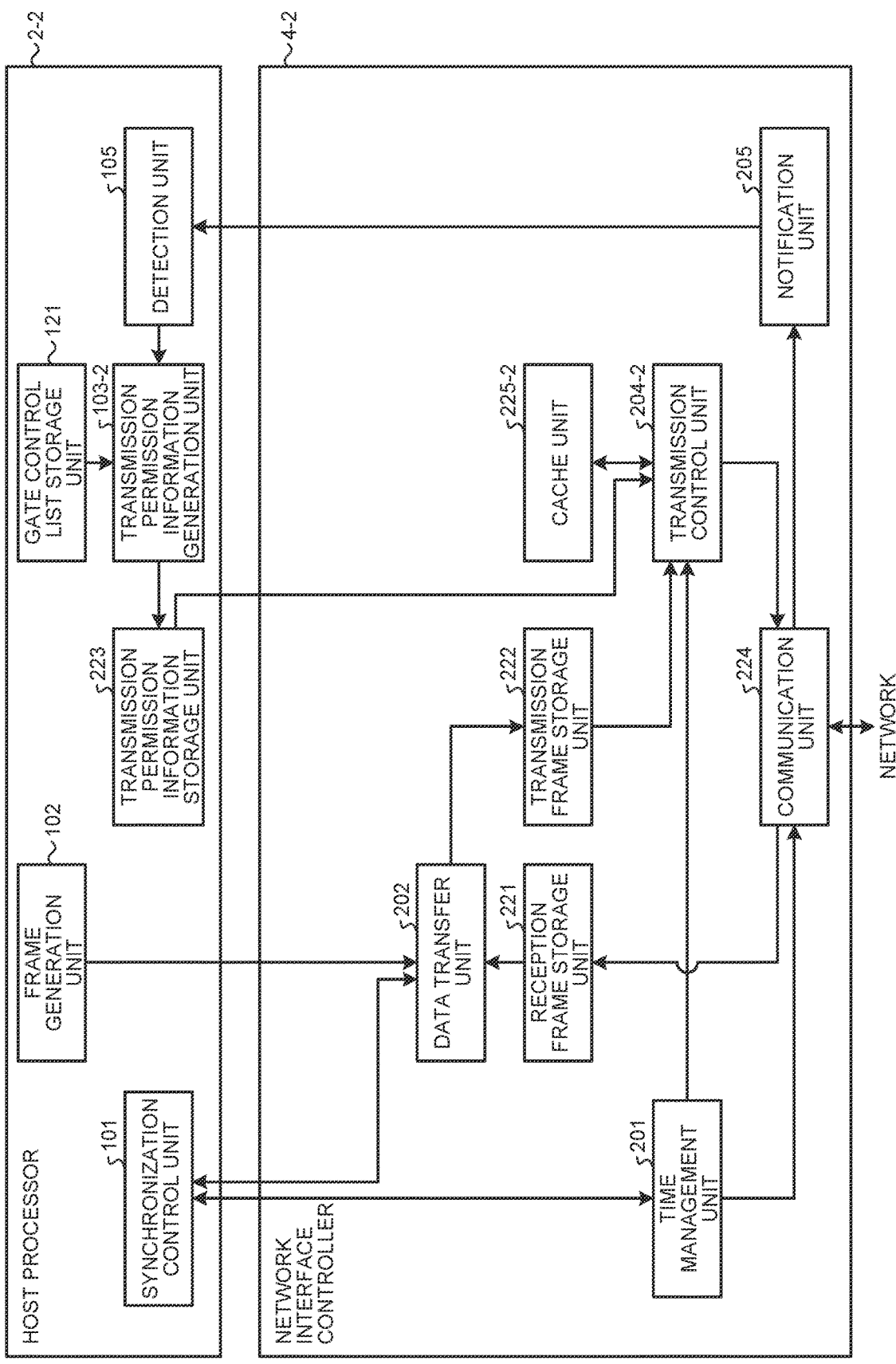
FIG. 24 is a block diagram of a communication apparatus according to a first modification.

The transmission permission information storage unit 223 may be provided in a host processor 2-2. FIG. 24 is a block diagram illustrating an example of the functional configuration of a communication apparatus (the host processor 2-2, and a network interface controller 4-2) according to a first modification.

As illustrated in FIG. 24, the host processor 2-2 according to the first modification is different from the host processor 2 according to the embodiments described above in that the host processor 2-2 includes not setting unit 104 but the transmission permission information storage unit 223, and in the function of a transmission permission information generation unit 103-2. Furthermore, the network interface controller 4-2 according to the first modification is different from the network interface controller 4 according to the embodiments described above in that the network interface controller 4-2 includes not the reception unit 203 or the transmission permission information storage unit 223 but a cache unit 225-2, and in the function of a transmission control unit 204-2. The other configurations are the same as those of FIG. 2, and thus denoted by the same reference numerals, and the description thereof will be omitted.

In the first modification, a transmission permission information generation unit 103-2 stores generated transmission permission information, in the transmission permission information storage unit 223 in the host processor 2-2.

The transmission control unit 204-2 acquires transmission permission information directly from the transmission permission information storage unit 223 without using the setting unit 104 and the reception unit 203. For example, the transmission control unit 204-2 acquires transmission permission information from the transmission permission information storage unit 223 by DMA.

The cache unit 225-2 is a storage medium (temporary storage unit) configured to temporarily store at least part of transmission permission information. The cache unit 225-2 includes, for example, a storage medium that is configured to be accessed at a higher speed than the transmission permission information storage unit 223. Note that the cache unit 225-2 may not necessarily be provided.

For example, the transmission control unit 204-2 periodically reads transmission permission information from the transmission permission information storage unit 223 in advance and stores the transmission permission information in the cache unit 225-2. This makes it possible to cope with a case where a memory of the network interface controller 4-2 is not so large to store all the transmission permission information.

Figure 25:
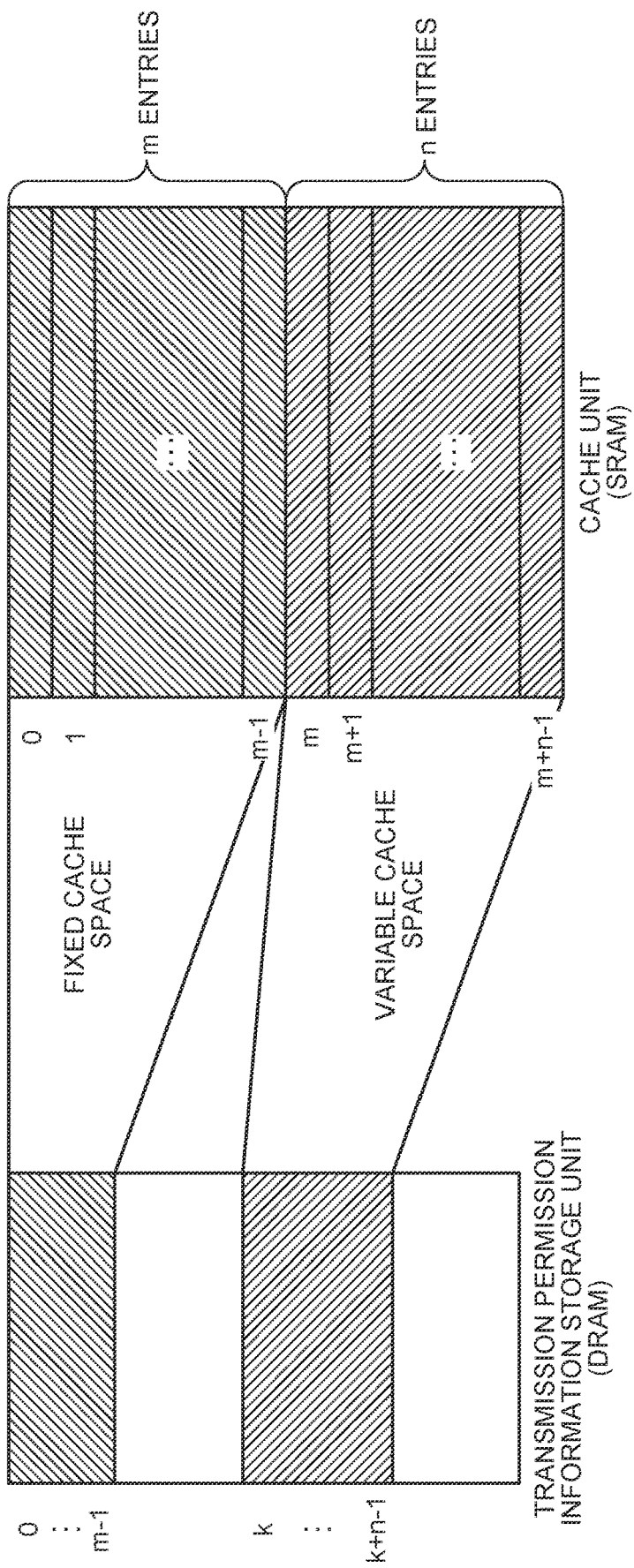
FIG. 25 is a diagram illustrating a configuration example of a cache space in a cache unit.

The cache unit 225-2 may be configured to include a plurality of storage areas (cache spaces) in order to prevent exhaustion of the transmission permission information necessary for the transmission control. FIG. 25 is a diagram illustrating a configuration example of the cache spaces in the cache unit 225-2. The transmission permission information storage unit 223 may include a large-capacity memory such as a DRAM in addition to the SRAM as described above. Meanwhile, the cache unit 225-2 includes a memory, such as an SRAM, that has a capacity smaller than that of the transmission permission information storage unit 223 but enables high speed reading in a constant delay.

As illustrated in FIG. 25, the cache unit 225-2 includes the fixed (or static) cache space (an example of a fixed memory space) and the variable (or dynamic) cache space (an example of a variable memory space). The fixed cache space stores predetermined transmission permission information of the transmission permission information stored in the transmission permission information storage unit 223. The predetermined transmission permission information is, for example, a fixed number of pieces of transmission permission information starting from the head of the transmission permission information. The variable cache space stores a fixed number of pieces of transmission permission information of transmission permission information other than the transmission permission information stored in the fixed cache space, the transmission permission information varying according to the transmission control.

In the example of FIG. 25, the cache unit 225-2 stores m entries in the fixed cache space and stores n entries in the variable cache space. The information in a head region (entries 0 to m−1) of the transmission permission information storage unit 223 is written in the fixed cache space, and the information in part of the other regions (entries k to k+n−1) is written in the variable cache space. k is an offset from the head of the transmission permission information. A portion of the variable cache space that has been read by the transmission control unit 204-2 is overwritten and reused.

Any value may be set for the number of entries "m" of the fixed cache space and the number of entries "n" of the variable cache space and may be determined, for example, on the basis of the capacity of the SRAM or the like to be used. Use of m and n makes it possible to change a ratio of the fixed cache space to the variable cache space. For example, "m=n" for a ratio of 1:1, or "2 m=n" for a ratio of 1:2 may be set.

Figure 26:
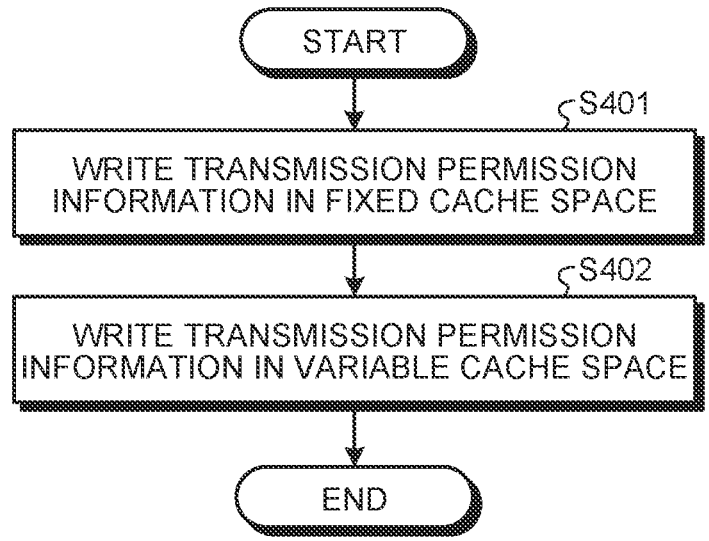
FIG. 26 is a flowchart of an initialization process of the cache unit.

FIG. 26 is a flowchart illustrating an example of an initialization process of the cache unit 225-2. The initialization process is executed when the gate control information is updated, for example, by the user setting or setting over the network.

The transmission control unit 204-2 writes the transmission permission information starting from the head of the information, in the fixed cache space (Step S401). When all of the information in the head region of the transmission permission information are written in the fixed cache space, the transmission control unit 204-2 goes on writing the information in the entries, in the variable cache space, starting from the (m+1)th entry, when the fixed cache space is configured to cache the m entries (Step S402).

In a case where the variable cache space is configured to cache n entries, the initialization process is completed when the information in the n entries is written in the variable cache space. The transmission control unit 204-2 manages a position where writing is completed.

Then, the transmission control unit 204-2 reads the transmission permission information stored in the fixed cache space or variable cache space for use in the transmission control process. When the reading of the transmission permission information stored in the variable cache space is completed, the transmission control unit 204-2 updates the transmission permission information stored in the variable cache space.

For example, the transmission control unit 204-2 updates entries ranging from an entry that is subsequent to the last write position in the variable cache space to an entry that is positioned before a read position at which the transmission control unit 204-2 is reading an entry.

Figure 27:
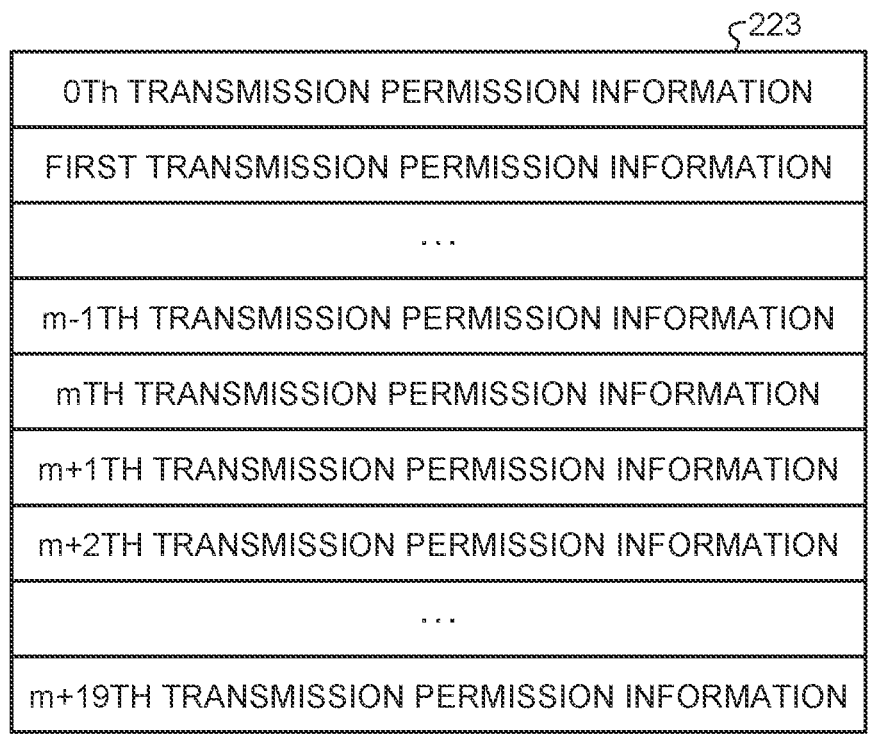
FIG. 27 is a diagram illustrating an example of the transmission permission information stored in a transmission permission information storage unit.

A specific example of an update process for the transmission permission information will be described with reference to FIGS. 27 to 34. For ease of description, the number n of the entries in the variable cache space is 10. As illustrated in FIG. 27, the number of pieces of the transmission permission information stored in the transmission permission information storage unit 223 is m+20 (0th to m+19th transmission permission information).

Figure 28:
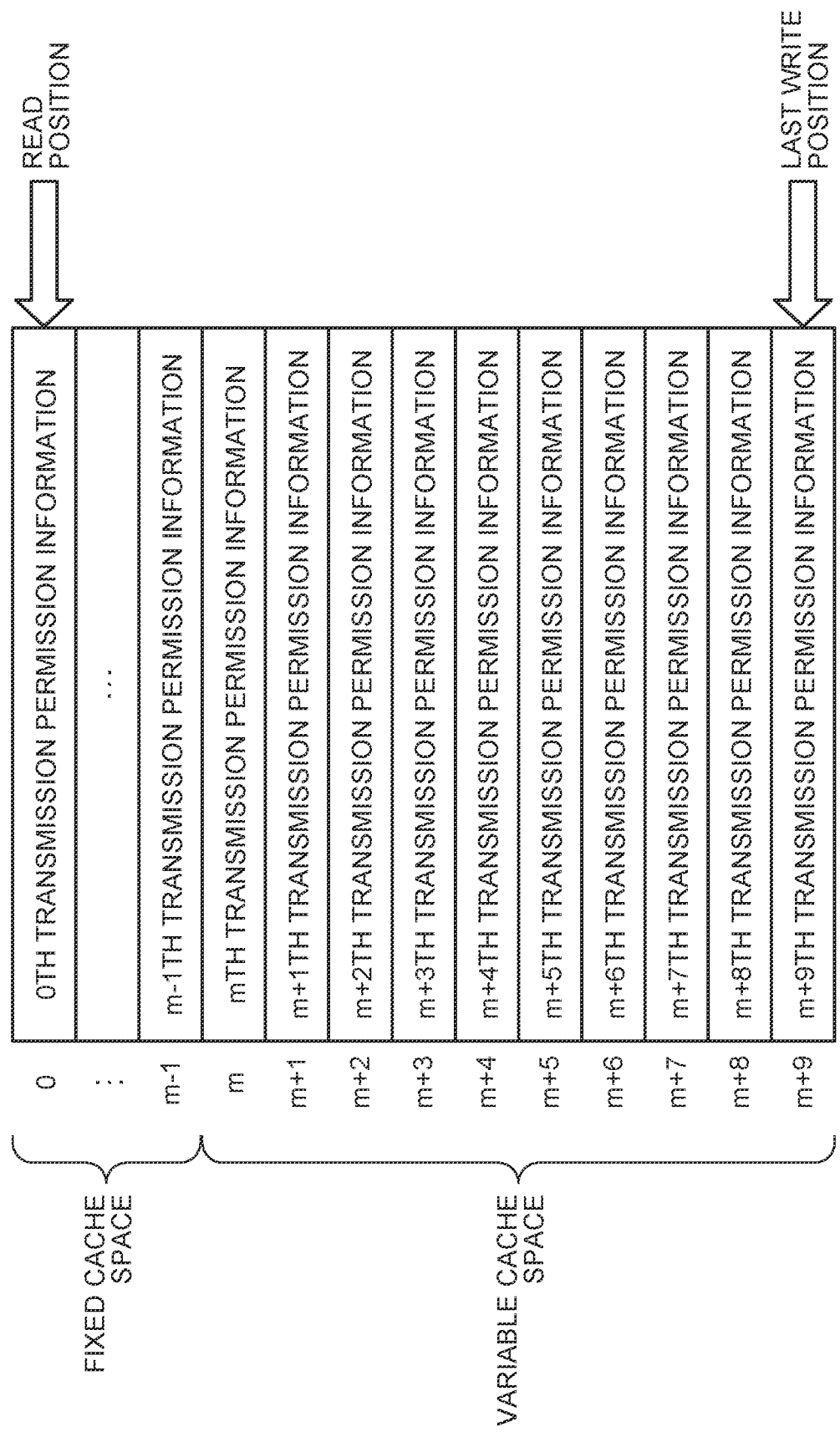
FIG. 28 is a diagram illustrating an example of a state in the cache unit.

FIG. 28 is a diagram illustrating a state of the cache unit 225-2 after the initialization process illustrated in FIG. 26. In this state, the 0th transmission permission information to the m−1th transmission permission information of the transmission permission information storage unit 223 are stored in the entries 0 to m−1 in the fixed cache space, and the mth to m+9th transmission permission information of the transmission permission information storage unit 223 are stored in the entries m to m+9 in the variable cache space. At this time, m+9 is the last write position. Note that the variable cache space functions as a circular buffer, and therefore, the position subsequent to m+9 is m. When the transmission control is enabled, the transmission control unit 204-2 reads the transmission permission information of the entry 0 corresponding to the current read position 0 and performs the transmission control.

Figure 29:
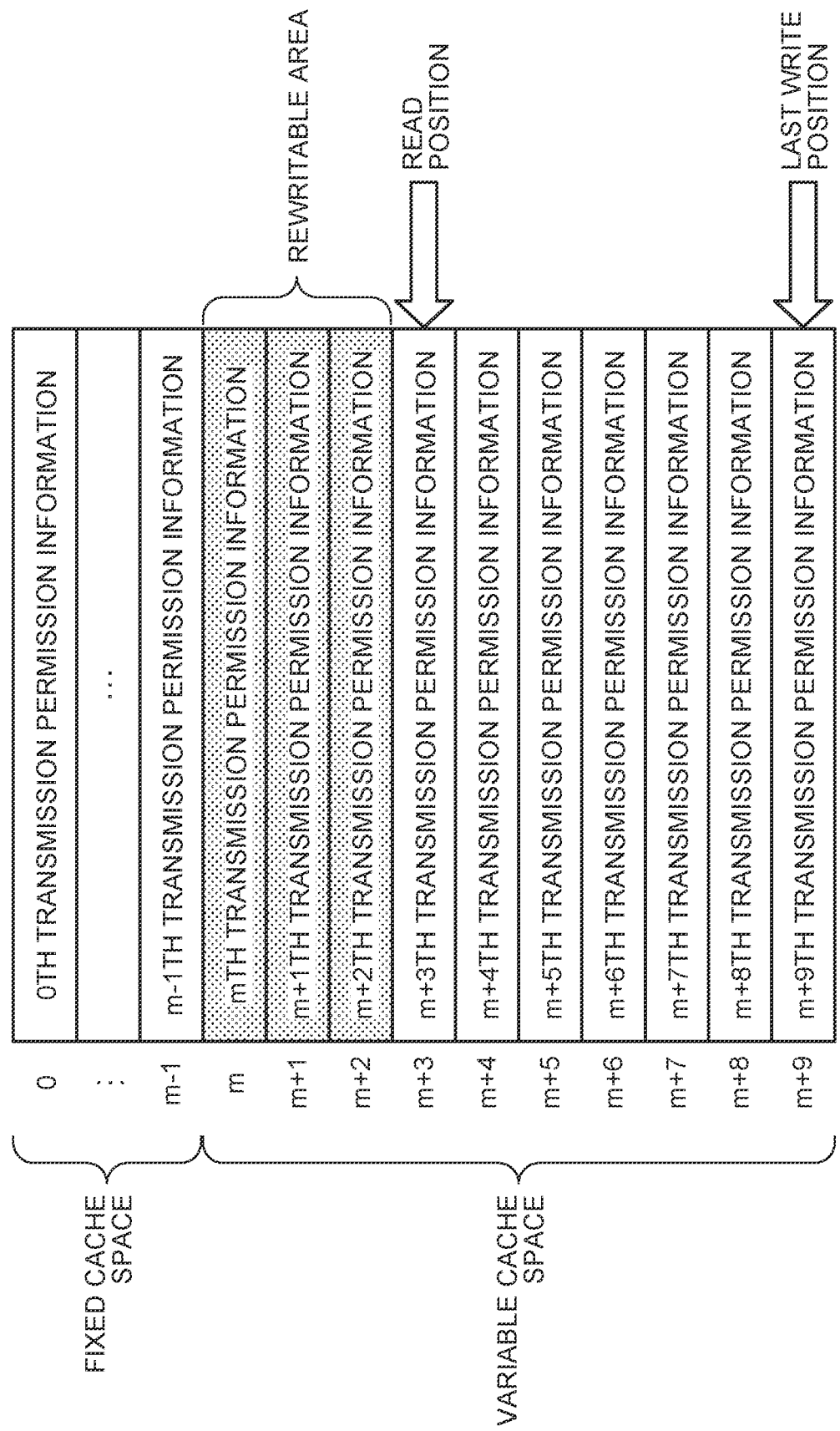
FIG. 29 is a diagram illustrating an example of a state in the cache unit.

FIG. 29 is a diagram illustrating a state in which time has elapsed and the read position of the transmission control unit 204-2 is changed to m+3. In this state, the transmission permission information of the entries m to m+2 corresponding to the entries from the entry subsequent to the last write position to the entry before the read position is not referred to immediately in the future. This is because the transmission permission information is sequentially read and used starting from the head as time passes. Therefore, the transmission control unit 204-2 updates these entries.

Figure 30:
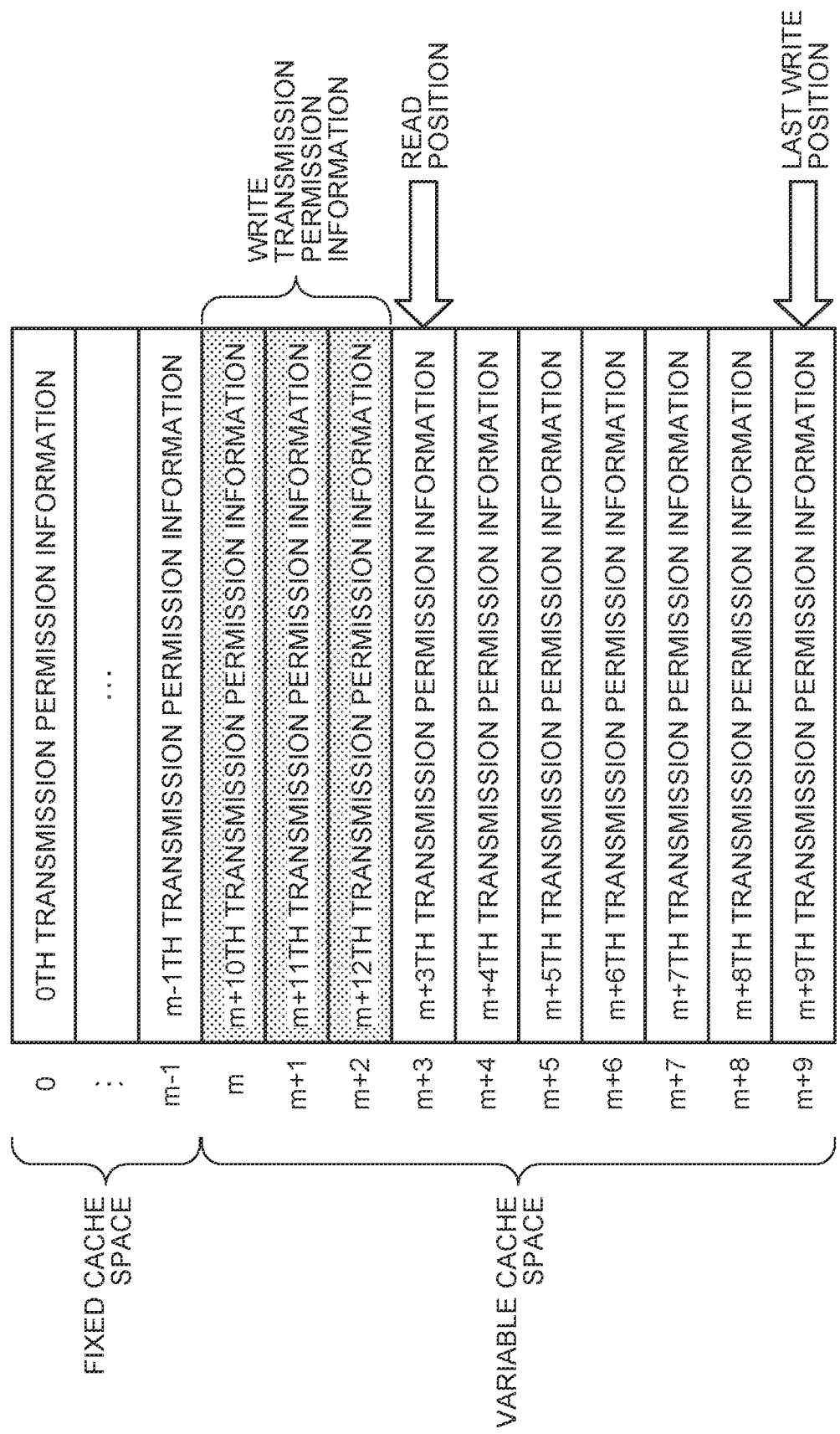
FIG. 30 is a diagram illustrating an example of a state in the cache unit.

FIG. 30 is a diagram illustrating a state after these entries have been updated. The transmission control unit 204-2 reads the transmission permission information, the number of pieces of which corresponds to rewritable areas in the variable cache space, from a position subsequent to the last transmission permission information written in the transmission permission information storage unit 223, and writes the read transmission permission information in the variable cache space. In the example of FIG. 30, the transmission control unit 204-2 writes the m+10th to m+12 transmission permission information, in the entries m to m+2.

Figure 31:
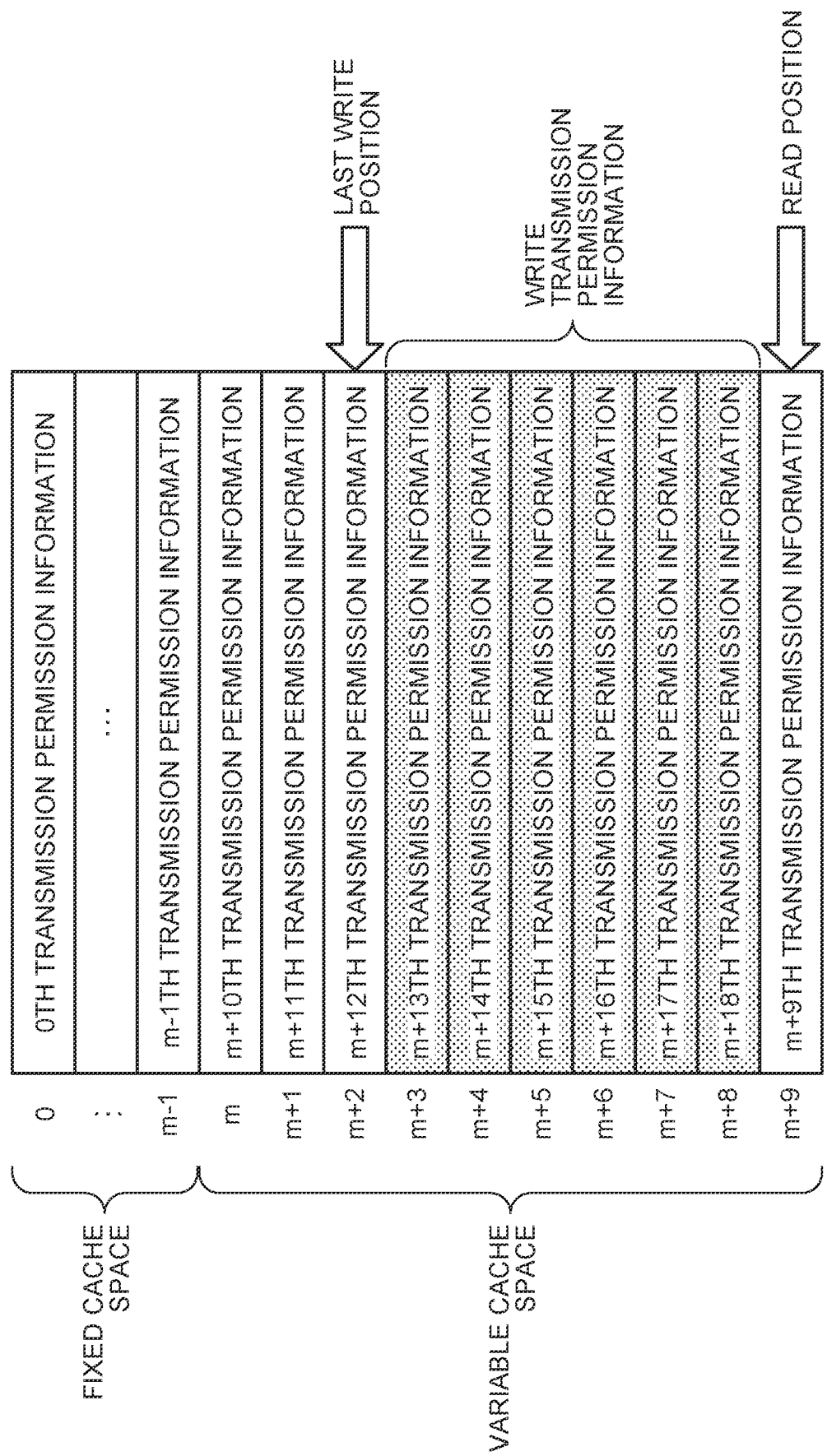
FIG. 31 is a diagram illustrating an example of a state in the cache unit.

Likewise, FIG. 31 is a diagram illustrating a state after time has elapsed and the entries m+3 to m+8 have been updated. In other words, when the read position reaches m+9 after time has elapsed, the entries m+3 to m+8 are updated. As described above, the variable cache space is the circular buffer (ring buffer), and thus, the entry subsequent to m+9 is m.

Figure 32:
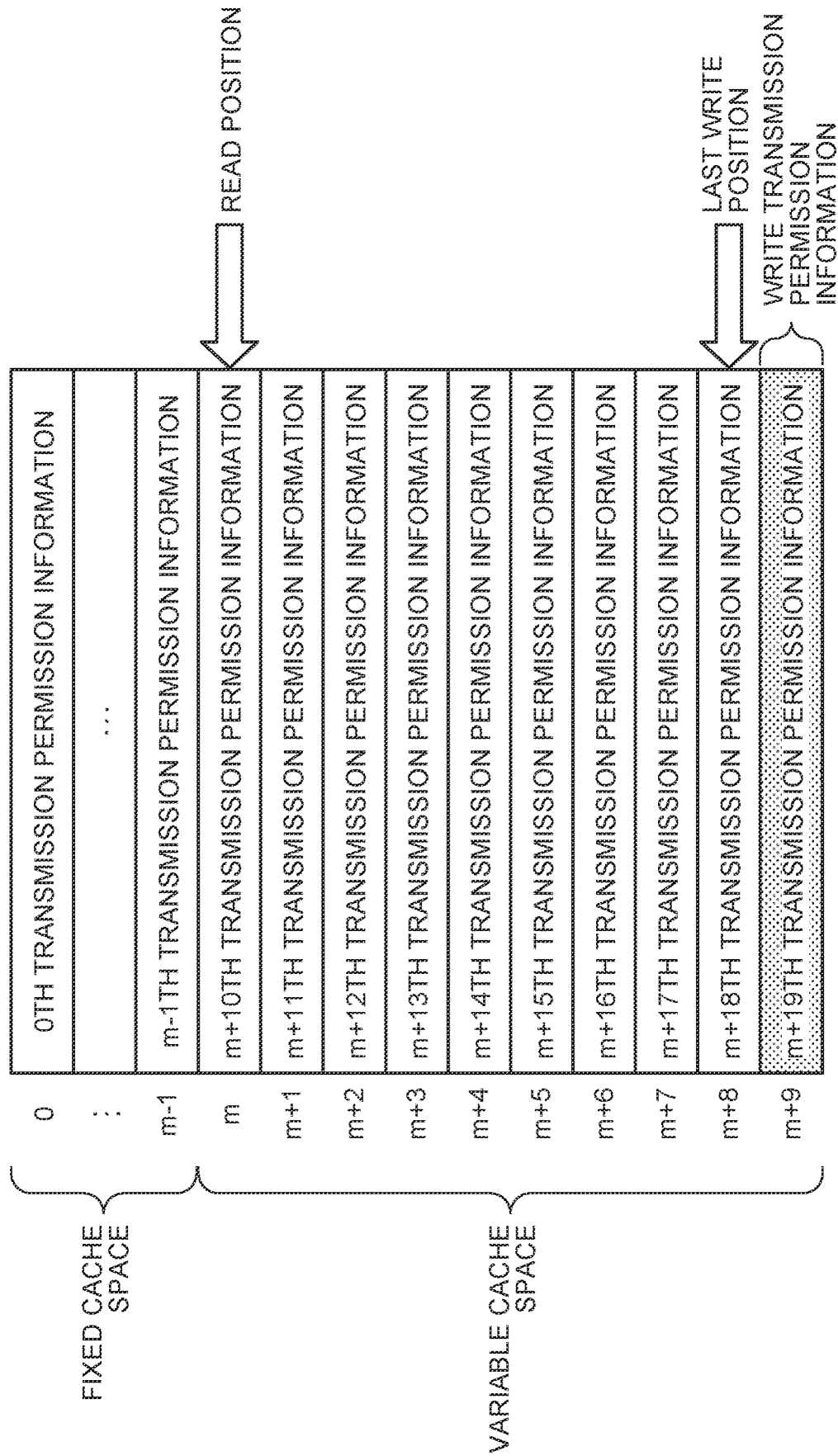
FIG. 32 is a diagram illustrating an example of a state in the cache unit.

When the read position circulates and reaches m, the transmission control unit 204-2 updates the entry m+9 corresponding to a position subsequent to the last write position. FIG. 32 is a diagram illustrating a state after the entry m+9 has been updated.

In this manner, the variable cache space is configured to store the transmission permission information to be referred to next, while updating the transmission permission information.

Note that the gate control is operated by a clock (local clock) that controls the operation of the transmission control unit 204-2. According to the present embodiment, storing a fixed number of pieces of transmission permission information starting from the head of the transmission permission information, in the fixed cache space, enables transmission control without exhaustion (underrun) of the transmission permission information even when an operation of returning the gate control list to the first entry by the signal (CycleStart signal) called CycleStart, generated on the basis of the time of the time management unit 201.

Figure 33:
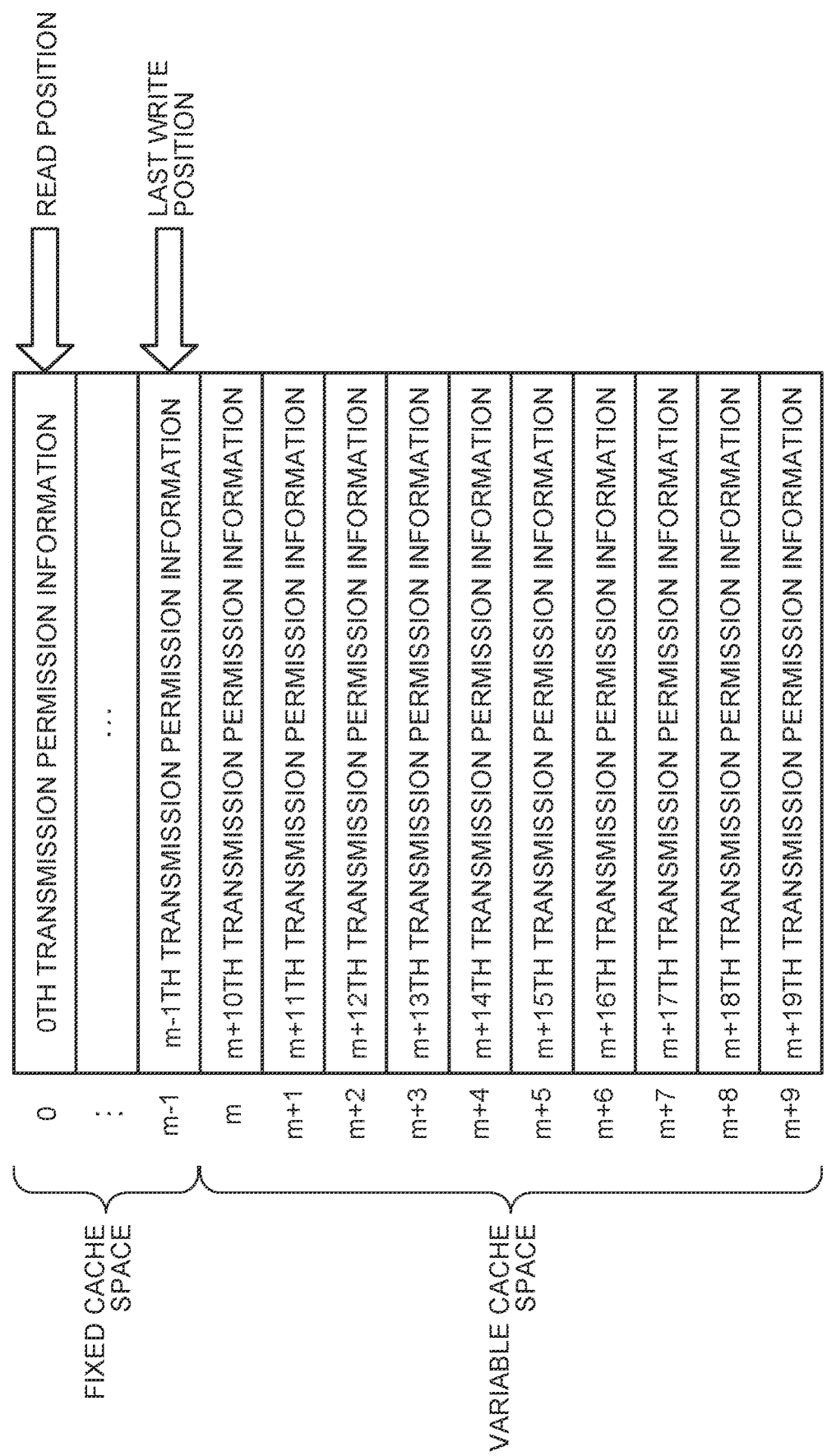
FIG. 33 is a diagram illustrating an example of a state in the cache unit.

FIG. 33 is a diagram illustrating a state in which the read position returns to the head by the CycleStart signal, from the state of FIG. 32. As illustrated in FIG. 33, the read position returns to 0, which is the head of the fixed cache space, and the last write position moves to m−1. Then, the transmission control unit 204-2 writes the transmission permission information to the variable cache space in the same manner as in the initialization process.

Figure 34:
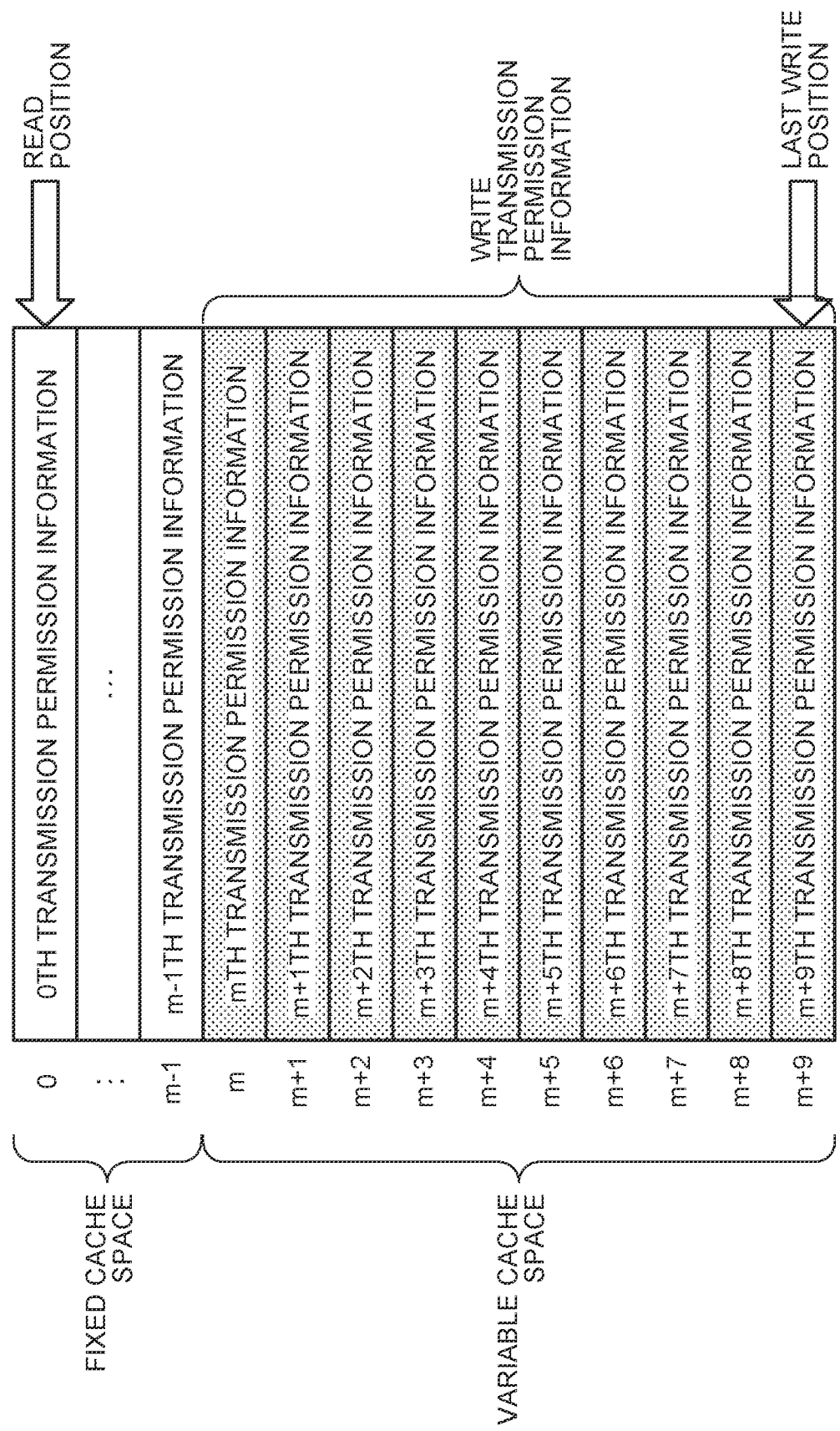
FIG. 34 is a diagram illustrating an example of a state in the cache unit.

FIG. 34 is a diagram illustrating a state after the transmission permission information has been written in the variable cache space in this manner. Such processing makes it possible to store the transmission permission information in the cache unit 225-2, even when the read position then moves to the variable cache space.

Figure 35:
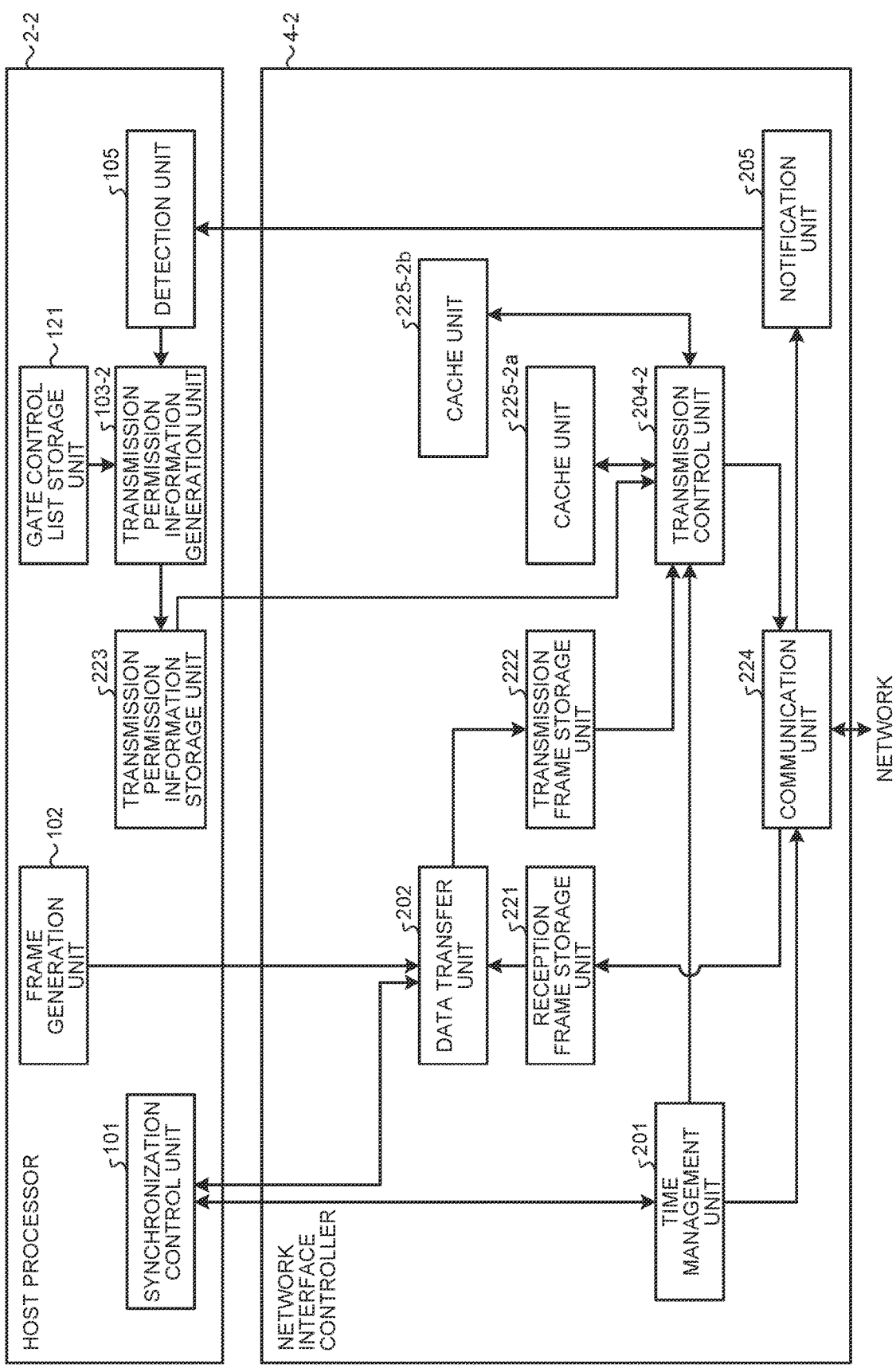
FIG. 35 is a block diagram of a communication apparatus including two cache units.

FIGS. 24 and 25 each illustrate the example in which one cache unit 225-2 is provided, but a plurality of cache units may be provided. FIG. 35 is a block diagram illustrating an example of a functional configuration of a communication apparatus (the host processor 2-2 and the network interface controller 4-2) that is configured to include two cache units 225-2a and 225-2b.

In the gate control, when switching is performed between old and new gate control lists, a time when the new gate control list becomes enabled is simultaneously specified. When switching to the new gate control list is performed, it is desirable for the transmission control unit 204-2 to perform the transmission control by using the old gate control list until immediately before the switching, and perform the transmission control by using the new gate control list immediately after the switching.

The two cache units 225-2a and 225-2b are configured to store the transmission permission information before and after the switching so that the cache units to be used can be switched, thus enabling switching the transmission permission information more accurately at the specified time. For example, the transmission control unit 204-2 stores new transmission permission information in one of the cache units 225-2a and 225-2b that is not currently used, in advance before the switching, and switches between the cache units to read the new transmission permission information at the timing of the switching (specified time). This configuration makes it possible to instantaneously switch to the gate control using the new transmission permission information, while performing the gate control by using the old transmission permission information until immediately before switching.

In the present modification, an example has been described in which the transmission permission information storage unit 223 is implemented in the host processor 2-2, that is, by the memory of the host processor 2-2. The transmission permission information storage unit 223 may be implemented by the memory (DRAM) of the network interface controller 4-2. In addition, the example has been described in which the transmission control unit 204-2 reads the transmission permission information from the transmission permission information storage unit 223 to cause the cache unit 225-2 to store the transmission permission information, but the method of storing the transmission permission information in the cache unit 225-2 is not limited thereto. For example, the transmission control unit 204-2 or another control unit may be configured to instruct a DMA controller to read the transmission permission information from the transmission permission information storage unit 223 and store the transmission permission information in the cache unit 225-2.

Note that, in the above drawing, the example has been illustrated in which the cache unit 225-2 is provided outside the transmission control unit 204-2, but registers (a fixed register and a dynamic register) inside the transmission control unit 204-2 can be considered as the cache unit.

The cache units 225-2, 225-2a, and 225-2b may include only the fixed cache space without including the variable cache space. In addition, the number of entries of the fixed cache space may be set to one.

Second Modification

Figure 36:
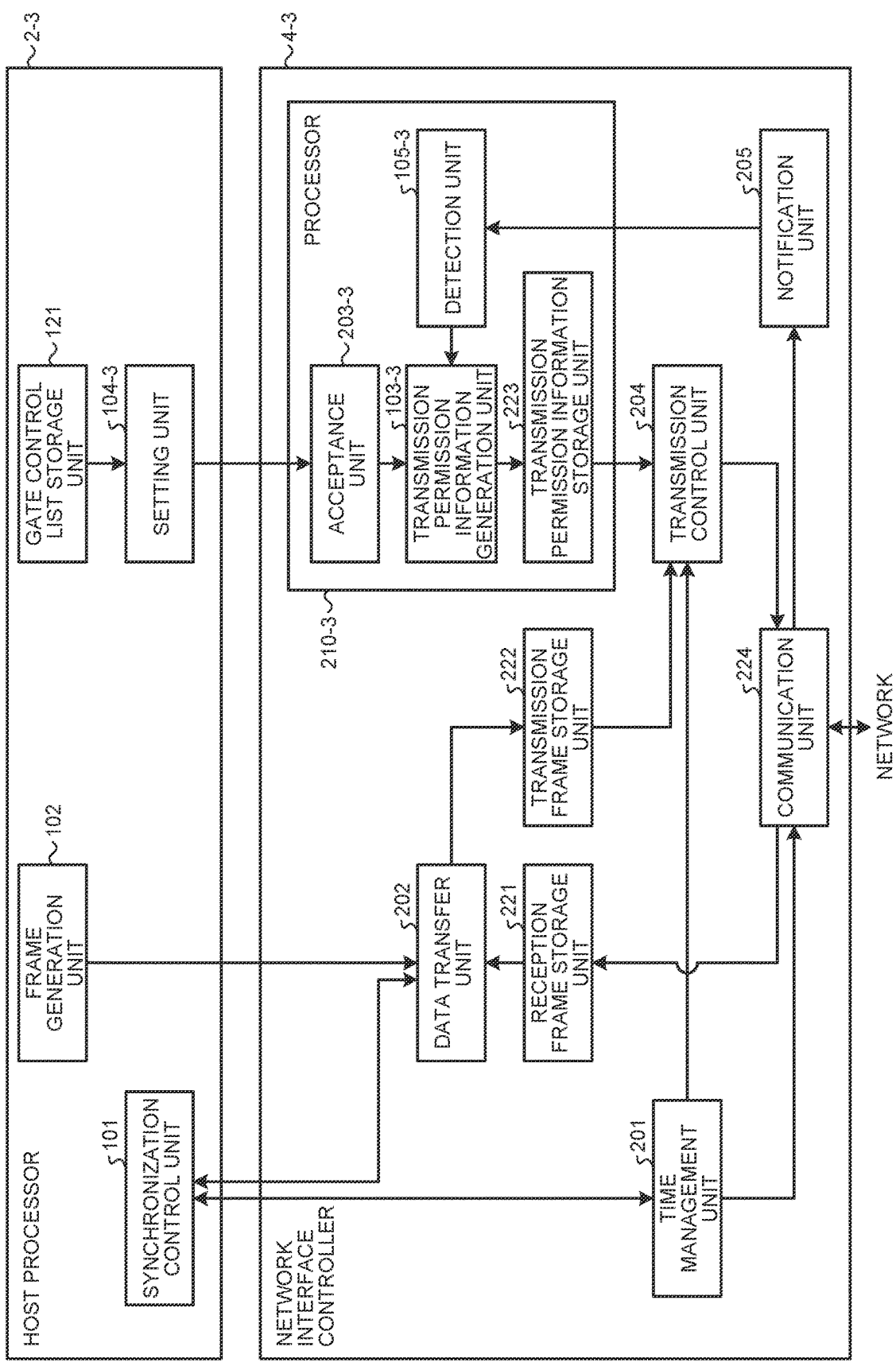
FIG. 36 is a block diagram of a communication apparatus according to a second modification.

The transmission permission information generation unit 103 and the detection unit 105 may be provided inside the network interface controller 4. FIG. 36 is a block diagram illustrating an example of a functional configuration of a communication apparatus (the host processor 2-3, and a network interface controller 4-3) according to a second modification.

As illustrated in FIG. 36, a host processor 2-3 according to the second modification is different from the host processor 2 according to the embodiments described above in that the host processor 2-3 includes no transmission permission information generation unit 103 or detection unit 105 and in the function of a setting unit 104-3. Furthermore, the network interface controller 4-3 according to the second modification is different from the network interface controller 4 according to the embodiments described above in that the network interface controller 4-3 includes a processor 210-3 that includes a reception unit 203-3, the transmission permission information storage unit 223, and the like. The other configurations are the same as those of FIG. 2, and thus denoted by the same reference numerals, and the description thereof will be omitted.

The setting unit 104-3 transmits a gate control list stored in the gate control list storage unit 121 to the network interface controller 4-3.

The processor 210-3 includes the reception unit 203-3, a transmission permission information generation unit 103-3, a detection unit 105-3, and the transmission permission information storage unit 223.

The reception unit 203-3 receives an input of the gate control list transmitted by the setting unit 104-3 of the host processor 2-3. The reception unit 203-3 may receive a gate control list from another device other than the host processor 2-3 over, for example, the network 200.

The transmission permission information generation unit 103-3 generates transmission permission information from the gate control list received by the reception unit 203-3.

The detection unit 105-3 detects the change in link speed via an internal bus of the network interface controller 4-3. When detecting the change in the link speed, the detection unit 105-3 instructs the transmission permission information generation unit 103-3 to generate the transmission permission information again. Other operations are the same as those in the embodiments described above.

Third Modification

Note that in the embodiments described above, a configuration including one network controller and one port has been described. A plurality of network controllers and a plurality of ports corresponding to each of the plurality of network controllers may be provided. In this configuration, transmission permission information is set for each port.

Furthermore, in the embodiments described above, the example in which the frame generation unit 102 is implemented by the host processor 2 has been described, but the frame generation unit 102 may be implemented by hardware such as FPGA and ASIC. In this configuration, the DMA function of the data transfer unit 202 may be eliminated so that data can be exchanged directly using a stream interface.

As described above, in the present embodiment, the hardware configuration or software processing is simplified but makes it possible to accurately operate according to the gate control list and effectively use a given communication resource. Furthermore, it is possible to give the transmission control process real-time performance (performance capable of finishing the process within a predetermined time).

System Configuration Example

Figure 37:
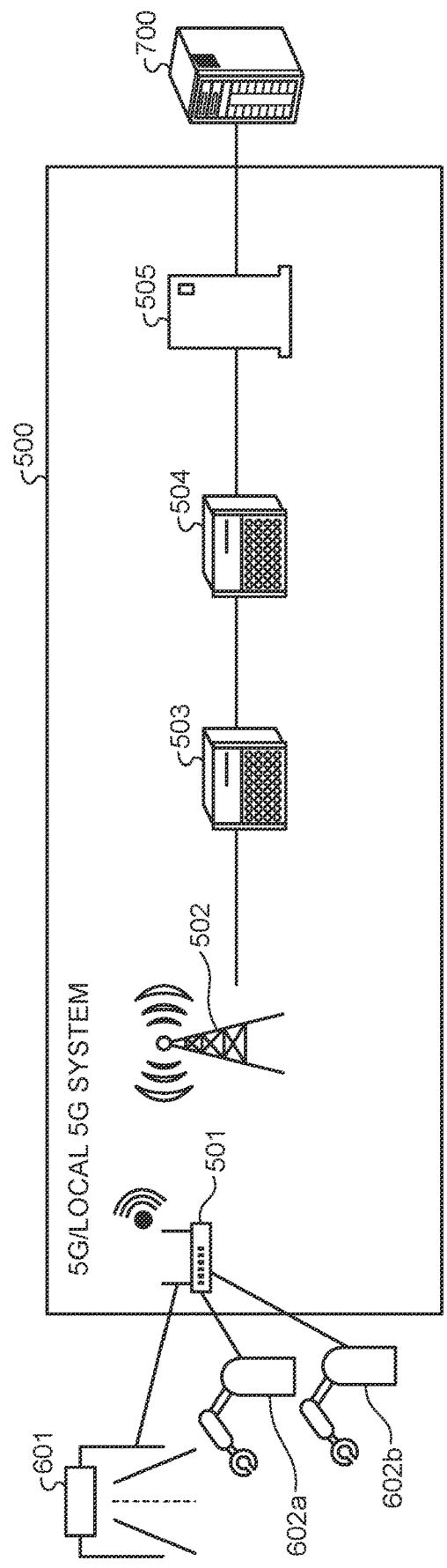
FIG. 37 is a diagram illustrating a configuration example of a system using the communication apparatus according to an embodiment.

FIG. 37 is a diagram illustrating a configuration example of a system that uses the communication apparatus according to the embodiments described above. FIG. 37 illustrates an example of controlling robot arms 602a and 602b and a conveyor belt 601 on a site, from an edge server 700 via a 5th generation (5G)/local 5G system 500, in a factory or a plant.

The 5G/local 5G system 500 includes a 5G core network 505, a central unit 504, a distributed unit 503, a remote unit 502, and user equipment 501. The 5G/local 5G system 500 performs 5G communication that is defined by the Third Generation Partnership Project (3GPP) standard.

The communication apparatus according to an embodiment may be implemented in, for example, the edge server 700 and the 5G core network 505. This configuration makes it possible to improve the real-time performance of communication between the edge server 700 and the 5G core network 505.

Furthermore, the communication apparatus according to an embodiment may be used for communication between the respective units in the 5G/local 5G system 500. In other words, to perform communication between the remote unit 502, the distributed unit 503, the central unit 504, and the 5G core network 505, the communication apparatus according to an embodiment may be implemented in at least some of the remote unit 502, the distributed unit 503, the central unit 504, and the 5G core network 505.

The communication apparatus according to an embodiment may be used for communication between at least one of the conveyor belt 601 and the robot arms 602a and 602b and the user equipment 501, or for communication between the conveyor belt 601 and the robot arms 602a and 602b.

The system to which the communication apparatus according to an embodiment is applicable is not limited to this description and may have any system. For example, the communication apparatus may also be applied to an industrial network system of the factory or the plant without using 5G/local 5G, a network system inside an automobile and an aircraft, and the like.

The computer programs executed by the communication apparatus (information processing device, communication control device) according to the present embodiment is provided by being incorporated in advance in the storage 3 and a ROM or the like, which is not illustrated. Note that, for example, in a case where the communication apparatus is implemented by FPGA, the data (configuration data) for setting the configuration of FPGA corresponds to the programs.

The programs executed by the communication apparatus according to the present embodiment may be configured to be provided as a computer program product by being recorded in a non-transitory computer-readable recording medium, such as a compact disk read only memory (CD- ROM), a flexible disk (FD), compact disk recordable (CD-R), or digital versatile disk (DVD), in an installable or executable file format.

Furthermore, the programs executed by the communication apparatus according to the present embodiment may be configured to be stored on a computer connected to a network such as the Internet so as to be provided by being downloaded over the network. Furthermore, the programs executed by the communication apparatus according to the present embodiment may be configured to be provided or distributed over a network such as the Internet.

The programs executed by the communication apparatus according to the present embodiment can cause a computer to function as the respective units of the communication apparatus described above. The computer allows the processor to load a program from a computer-readable storage medium into the main storage device and execute the program.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication control device comprising:
one or more hardware processors configured to function as:
a transmission control unit to perform control of transmission of one or more messages based on transmission permission information, the transmission permission information being generated based on gate control information including a plurality of first entries for determining whether to open a plurality of gates corresponding to a plurality of queues, the transmission permission information indicating a data amount of one or more transmittable messages in a period that represents a duration of one or more open entries continuing for each of the plurality of queues; and
a communication unit to transmit one or more messages in accordance with the control of the transmission control unit,
wherein
the period is represented in a number of clock cycles based on an operation clock of the transmission control unit, and
the transmission control unit determines, for every clock cycle according to the operation clock, whether transmission of the one or more messages is permitted based on the transmission permission information and performs control of transmission of a transmittable message.

2. The communication control device according to claim 1, wherein the transmission control unit subtracts, for every clock cycle according to the operation clock, a subtraction value corresponding to one clock cycle from an amount of transmittable messages indicated by the transmission permission information.

3. The communication control device according to claim 2, wherein the transmission control unit identifies the subtraction value determined according to the operation clock cycle, by using subtraction value information for identifying the subtraction value for each position of the operation clock in a cycle of a predetermined number of operation clock cycles.

4. The communication control device according to claim 1, further comprising a temporary storage configured to temporarily store the transmission permission information,
wherein the transmission control unit performs the control of transmission of one or more messages by opening and closing the gate, based on the transmission permission information stored in the temporary storage.

5. The communication control device according to claim 4, wherein
the transmission permission information includes a plurality of second entries each including the period and an amount of transmittable messages, and
the temporary storage includes
a fixed memory space for storing predetermined one or more of the plurality of second entries, and
a variable memory space for storing a fixed number of second entries out of the plurality of second entries, the fixed number of second entries being different from the second entries stored in the fixed memory space.

6. The communication control device according to claim 5, wherein the fixed memory space stores a predetermined number of second entries out of the plurality of second entries, the predetermined number starting from a head of the plurality of second entries.

7. The communication control device according to claim 5, wherein the variable memory space stores a predetermined number of second entries out of the plurality of second entries, the predetermined number of second entries including a second entry which is read after another second entry used for control of the messages by the transmission control unit.

8. The communication control device according to claim 1, wherein
the one or more hardware processors are further configured to function as a reception unit to receive an input of the transmission permission information, and
the transmission control unit performs the control of transmission of one or more messages by opening and closing the gate, based on the transmission permission information received by the reception unit.

9. The communication control device according to claim 1, wherein the transmission control unit performs the control of transmission of one or more messages by opening and closing the gate, based on the transmission permission information received through Direct Memory Access (DMA) from a storage device storing the transmission permission information.

10. The communication control device according to claim 1, wherein the one or more hardware processors are further configured to function as a transmission permission information generation unit to generate the transmission permission information based on the gate control information.

11. The communication control device according to claim 1, wherein the transmission permission information is generated based on
the gate control information, and
at least one of a communication speed of the communication unit and an operation speed of the transmission control unit.

12. The communication control device according to claim 1, wherein the data amount is calculated based on a link speed and a continuous open duration, the link speed being a speed of communication by the communication control device, the continuous open duration being a time period during which opening of one or more gates continues.

13. The device according to claim 12, wherein the one or more hardware processors are configured to:
detect a change in the link speed, and
calculate the data amount when the change in the link speed is detected.

14. An information processing device comprising:
one or more hardware processors configured to function as a transmission permission information generation unit to generate transmission permission information based on gate control information, the gate control information including a plurality of first entries for determining whether to open a plurality of gates corresponding to a plurality of queues, the transmission permission information indicating a data amount of one or more transmittable messages in a period that represents a duration of one or more open entries continuing for each of the plurality of queues, wherein
the period is represented in a number of clock cycles based on an operation clock of the transmission control unit.

15. The information processing device according to claim 14, further comprising
transmission permission information storage that stores the transmission permission information generated by the one or more hardware processors and outputs the stored transmission permission information to a communication control device according to direct memory access (DMA).

16. The information processing device according to claim 14, wherein the transmission permission information generation unit generates the transmission permission information based on
the gate control information, and
at least one of a communication speed and an operation speed with respect to transmission messages.

17. The information processing device according to claim 16, wherein the one or more hardware processors are further configured to function as a detection unit to detect the communication speed and/or the operation speed,
wherein the transmission permission information generation unit generates the transmission permission information based on the gate control information and the communication speed and/or the operation speed detected by the detection unit.

18. A communication control method implemented by a computer, the method comprising:
performing control of transmission of one or more messages based on transmission permission information, the transmission permission information being generated based on gate control information including a plurality of first entries for determining whether to open a plurality of gates corresponding to a plurality of queues, the transmission permission information indicating a data amount of one or more transmittable messages in a period that represents a duration of one or more open entries continuing for each of the plurality of queues; and
transmitting one or more messages in accordance with the control,
wherein
the period is represented in a number of clock cycles based on an operation clock of the control, and
the transmitting includes determining, for every clock cycle according to the operation clock, whether transmission of the one or more messages is permitted based on the transmission permission information and performing control of transmission of a transmittable message.

19. A computer program product comprising a non-transitory computer-readable recording medium on which an executable program is recorded, the program instructing a computer to:
performing control of transmission of one or more messages based on transmission permission information, the transmission permission information being generated based on gate control information including a plurality of first entries for determining whether to open a plurality of gates corresponding to a plurality of queues, the transmission permission information indicating a data amount of one or more transmittable messages in a period-that represents a duration of one or more open entries continuing for each of the plurality of queues; and
transmitting one or more messages in accordance with the control,
wherein
the period is represented in a number of clock cycles based on an operation clock of the control, and
the transmitting includes determining, for every clock cycle according to the operation clock, whether transmission of the one or more messages is permitted based on the transmission permission information and performing control of transmission of a transmittable message.

20. An information processing method implemented by a computer, the method comprising:
generating transmission permission information based on gate control information, the gate control information including a plurality of first entries for determining whether to open a plurality of gates corresponding to a plurality of queues, the transmission permission information indicating a data amount of one or more transmittable messages in a period that represents a duration of one or more open entries continuing for each of the plurality of queues,
wherein
the period is represented in a number of clock cycles based on an operation clock of a transmission control; and
determining, for every clock cycle according to the operation clock, whether a transmission of one or more messages is permitted based on the transmission permission information and performing control of transmission of a transmittable message.

21. A computer program product comprising a non-transitory computer-readable recording medium on which an executable program is recorded, the program instructing a computer to:
generate transmission permission information based on gate control information, the gate control information including a plurality of first entries for determining whether to open a plurality of gates corresponding to a plurality of queues, the transmission permission information indicating a data amount of one or more transmittable messages in a period that represents a duration of one or more open entries continuing for each of the plurality of queues, wherein
- the period is represented in a number of clock cycles based on an operation clock of a transmission control; and
- determining, for every clock cycle according to the operation clock, whether a transmission of one or more messages is permitted based on the transmission permission information and performing control of transmission of a transmittable message.

* * * * *

UNITED STATES PATENT AND TRADEMARK OFFICE
CERTIFICATE OF CORRECTION

PATENT NO. : 11,755,517 B2
APPLICATION NO. : 17/446433
DATED : September 12, 2023
INVENTOR(S) : Takahiro Yamaura et al.

It is certified that error appears in the above-identified patent and that said Letters Patent is hereby corrected as shown below:

In the Claims

Claim 19, Column 28, Lines 13, "performing" should read as --perform--.

Claim 19, Column 28, Line 21, "period-that" should read as --period that--.

Claim 19, Column 28, Line 24, "transmitting" should read as --transmit--.

Signed and Sealed this
Thirtieth Day of January, 2024

Katherine Kelly Vidal
*Director of the United States Patent and Trademark Office*